US011837818B2

(12) United States Patent
Matsunaga et al.

(10) Patent No.: US 11,837,818 B2
(45) Date of Patent: Dec. 5, 2023

(54) ELECTRICAL POWER UNIT AND WORK MACHINE

(71) Applicant: HONDA MOTOR CO., LTD., Tokyo (JP)

(72) Inventors: Naoki Matsunaga, Saitama (JP); Fumiyoshi Kambara, Saitama (JP); Yoshitaka Oota, Saitama (JP); Keisuke Muraoka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 105 days.

(21) Appl. No.: 17/598,901

(22) PCT Filed: Mar. 25, 2020

(86) PCT No.: PCT/JP2020/013263
§ 371 (c)(1),
(2) Date: Sep. 28, 2021

(87) PCT Pub. No.: WO2020/196603
PCT Pub. Date: Oct. 1, 2020

(65) Prior Publication Data
US 2022/0166162 A1    May 26, 2022

(30) Foreign Application Priority Data

Mar. 28, 2019   (WO) .................. PCT/2019/013833

(51) Int. Cl.
*H01R 13/639*   (2006.01)
*H01R 13/52*    (2006.01)

(52) U.S. Cl.
CPC ..... *H01R 13/5221* (2013.01); *H01R 13/5202* (2013.01); *H01R 13/5213* (2013.01); *H01R 13/639* (2013.01)

(58) Field of Classification Search
CPC ............ H01R 13/5221; H01R 13/5202; H01R 13/5213; H01R 13/639; H01R 13/6395; H01R 13/72; H01R 13/60
See application file for complete search history.

(56) References Cited

U.S. PATENT DOCUMENTS 2,709,245 A * 5/1955 Schneider .............. H01R 13/60
99/385
5,630,419 A * 5/1997 Ranalletta ................ A61B 8/00
600/459

(Continued)

FOREIGN PATENT DOCUMENTS

CN      102852134 A    1/2013
CN      206742533 U    12/2017

(Continued)

OTHER PUBLICATIONS

Office Action issued in the CN Patent Application No. 202080024857.0, dated Feb. 11, 2023.

*Primary Examiner* — Tho D Ta
(74) *Attorney, Agent, or Firm* — CKC & PARTNERS CO., LLC

(57) ABSTRACT

The electrical power unit is provided with: a power unit body; an electrical component for driving the power unit body; and a connecting terminal which is disposed at the tip end of an electrically conductive path member extending from the power unit body and connectable to the electrical component. The connecting terminal is provided detachably to an attaching portion of the power unit body.

21 Claims, 40 Drawing Sheets

(56) References Cited

U.S. PATENT DOCUMENTS

| | | | |
|---|---|---|---|
| 6,676,422 | B1 | 1/2004 | Baker et al. |
| 7,275,956 | B1 * | 10/2007 | Montesano .......... H01R 9/2416 |
| | | | 439/13 |
| 7,682,102 | B1 | 3/2010 | Burke et al. |
| 7,914,306 | B1 * | 3/2011 | Blackwell .......... H01R 13/5213 |
| | | | 439/588 |
| 8,435,041 | B2 * | 5/2013 | Holland ............... H01R 13/447 |
| | | | 439/38 |
| 9,623,752 | B2 * | 4/2017 | Mouri ..................... B60L 1/006 |
| 2003/0037525 | A1 * | 2/2003 | Iida .................... A01D 34/6812 |
| | | | 56/11.9 |
| 2004/0097126 | A1 | 5/2004 | Chen |
| 2011/0211910 | A1 | 9/2011 | Argento et al. |
| 2013/0004237 | A1 | 1/2013 | Krings et al. |
| 2016/0172777 | A1 | 6/2016 | Bellet et al. |
| 2016/0197561 | A1 | 7/2016 | Riphin |

FOREIGN PATENT DOCUMENTS

| | | |
|---|---|---|
| CN | 108112339 A | 6/2018 |
| CN | 208478747 U | 2/2019 |
| CN | 208608487 U | 3/2019 |
| DE | 19957368 A1 | 6/2001 |
| DE | 202018005082 U1 * | 1/2019 |
| EP | 3331056 A1 | 6/2018 |
| JP | H0267572 U | 5/1990 |
| JP | 2012190736 A | 10/2012 |
| JP | 2013015009 A | 1/2013 |
| JP | 3207870 U | 12/2016 |

\* cited by examiner

ELECTRICAL POWER UNIT AND WORK MACHINE

TECHNICAL FIELD

The present invention relates to an electrical power unit and a work machine.

BACKGROUND ART

Conventionally, the need to use an electrical power unit having a motor as the drive source of a work machine such as a ground leveling device for example a plate compactor and a rammer, or a brush cutter for example a mower.

Patent Document 1 discloses an asphalt tamper including a rechargeable battery, and a motor supplied electricity from the rechargeable battery within a housing. The rechargeable battery is configured so to be recharged by connection with a charging cord.

Patent Document 1: U.S. Pat. No. 7,682,102

DISCLOSURE OF THE INVENTION

Problems to be Solved by the Invention

Generally, a work machine is often used under an environment exposed to dust, dirt and rain. For this reason, in the case of installing an electrical power unit having connection terminal for performing electrical connection to the work machine, it is necessary to prevent the electrical terminals from being contaminated with dust, dirt and rain. This is because, during non-use of the work machine or the like, the connection terminals are in the unconnected state and exposed to outside.

Normally, with the purpose of contamination prevention of the connection terminals, it has been considered to protect the connection terminals by covering with a protective member such as caps. However, there has been a problem in that the protective members are easily lost due to being removed when the connection terminal is the connection state. Furthermore, since the connection terminals are still projecting to outside of the electrical power unit in a state protected by the protective members when in the unconnected state, there is concern over hitting an object outside and breaking during transport of the electrical power unit or the like. For this reason, in the electrical power unit, relative to the location of the protective member in the connected state of the connection terminal, or the location of the connection terminal itself in the disconnected state, an allowance for improving the workability has been sought.

Therefore, the present invention has an object of providing an electrical power unit and work machine capable of improving workability at the location of a protective member in the connected state of the connection terminal, and the location of the connection terminal itself in the disconnected state.

Means for Solving the Problems

An electrical power unit (for example, the electrical power unit 1, 5, 7, 8 described later) according to a first aspect of the present invention includes: a power unit main body (for example, the power unit main body 2, 6 described later); an electrical component (for example, the battery 4 described later) which drives the power unit main body; and a connection terminal (for example, the connection terminal 24 described later) which is provided to a leading end of a conductive path member (for example, the harness 23 described later) extending from the power unit main body and capable of connecting to the electrical component, in which the connection terminal is provided to be capable of attaching and detaching to a mounting part (for example, the first mounting part 38, second mounting part 28 described later) of the power unit main body.

According to the first aspect, since it is possible to mount the connection terminal to the mounting part of the power unit main body while removing the connection terminal from the electrical component, it is possible to avoid the risk of the connection terminal mistakenly hitting an external object and damaging, upon transport of the electrical power unit itself or the work machine equipped with the electrical power unit. For this reason, it is possible to improve the workability at the location of the connection terminal in the disconnected state.

According to a second aspect of the present invention, the electrical power unit as described in the first aspect may have a protective member (for example, the cap 25 described later) capable of protecting the connection terminal separated from the electrical component.

According to the second aspect, since it is possible to protect the connection terminal by the protective member upon removing the connection terminal from the electrical component, the risk of damage to the connection terminal can be avoided much more.

According to a third aspect of the present invention, the electrical power unit as described in the first or second aspect may further include a placement member (for example, the battery tray 3 described later) to which the electrical component is detachably provided, in which the mounting part of the power unit main body may be provided to the placement member.

According to the third aspect, due to providing the mounting part to the placement member of the electrical component, it is possible to retain the connection terminal removed from the electrical component close to the electrical component. It is thereby possible to suppress the length of the conductive path member, and thus possible to configure the electrical power unit compactly.

According to a fourth aspect of the present invention, in the electrical power unit as described in the third aspect, a direction (for example, the direction D2 described later) in which the connection terminal is oriented upon the connection terminal being connected to the electrical component, and a direction (for example, the direction D1 described later) in which the connection terminal is oriented upon the connection terminal being mounted to the mounting part may be identical directions.

According to the fourth aspect, it is possible to suppress the length of the conductive path member, and thus possible to configure the electrical power unit compactly.

According to a fifth aspect of the present invention, in the electrical power unit as described in the third or fourth aspect, the connection terminal may have a detaching part (for example, the protruding part 244 described later) which is capable of attaching and detaching to the mounting part, the mounting part of the power unit main body may be provided to an upper face (for example, the upper face 31b described later) of the placement member, and the detaching part may be provided to a side face (for example, the side face 240b described later) of the connection terminal disposed in a direction intersecting a projecting direction of a terminal part (for example, the terminal part 241 described later) of the connection terminal upon the connection terminal being connected to the electrical component, or upon the connection terminal being mounted to the mounting part.

According to the fifth aspect, since it is possible to mount the connection terminal sideways to the power unit main body, upon removing the connection terminal from the electrical component, even if forgetting to mount the protective member to the connection terminal, it is possible to suppress rain water, etc. from infiltrating into the connection terminal.

According to a sixth aspect of the present invention, in the electrical power unit as described in the fifth aspect, the upper face of the placement member may be a substantially horizontal surface.

According to the sixth aspect, upon mounting the connection terminal sideways to the power unit main body, even if forgetting to mount the protective member to the connection terminal, it is possible to further suppress rain water, etc. from infiltrating into the connection terminal.

According to a seventh aspect of the present invention, in the electrical power unit as described in any one of the third to sixth aspects, the placement member may have a covering part (for example, the decorative cover 31 described later) which is disposed so as to project upwards from a circumference of the electrical component, and the mounting part may be provided to the covering part.

According to the seventh aspect, it is possible to bring together the connection position of the connection terminal upon the connection terminal being connected to the electrical component, and the mounting position of the connection terminal upon the connection terminal being mounted to the mounting part. For this reason, it is possible to further suppress the length of the conductive path member, and thus possible to configure the electrical power unit upon removing the connection terminal from the electrical component more compactly.

According to an eighth aspect of the present invention, in the electrical power unit as described in the seventh aspect, the mounting part may consist of a recess groove (for example, the recess groove 381 described later) open at an upper face (for example, the upper face 31b described later) of the covering part, a side farther from the electrical component of the recess groove may be blocked, and the detaching part of the connection terminal may be formed in a protruding shape having a locking part (for example, the protruding part 244 described later) to the recess groove.

According to the eighth aspect, it is possible to maintain the connection terminal strongly mounted to the mounting part. Since the mounting part is hardly visible from outside, it is possible to improve the design of the electrical power unit.

According to a ninth aspect of the present invention, in the electrical power unit as described in the eighth aspect, the placement member may have a placement member main body (for example, the tray main body 30 described later) to which the covering part is mounted at an upper face, the recess groove may have a lateral opening part (for example, the lateral opening part 381b described later) opened at a side close to the electrical component, and the placement member main body may have a projecting part (for example, the projecting part 302 described later) which is arranged below a bottom (for example, the bottom 381c described later) of the recess groove and overlaps the lateral opening part in a plan view, and may form a labyrinth structure by the bottom of the recess groove and the projecting part.

According to the ninth aspect, upon water splashing on the recess groove, it is possible to weaken the momentum of infiltrating water by the labyrinth structure. For this reason, it is possible to mitigate the water damage effects on components inside of the electrical power unit.

According to a tenth aspect of the present invention, in the electrical power unit as described in the first aspect, the connection terminal may have a detaching part (for example, the coupling base 243 described later) which is capable of attaching and detaching to the mounting part, and the detaching part may be provided to span between the connection terminal and the conductive path member.

According to the tenth aspect, it is possible to reinforce the connection site between the connection terminal and the conductive path member by the detaching part, and possible to reduce the influence imparted by the detaching part on the operability (ease of handling) of the connection terminal.

According to an eleventh aspect of the present invention, the work machine as described in the tenth aspect may further include a protective member (for example, the cap 25 described later) capable of protecting the connection terminal separated from the electrical component.

According to the eleventh aspect, since it is possible to protect the connection terminal by the protective member upon removing the connection terminal from the electrical component, the risk of damage to the connection terminal can be avoided much more.

According to a twelfth aspect of the present invention, in the work machine as described in the eleventh aspect, in a state in which the connection terminal protected by the protective member is mounted to the mounting part, a part of the connection terminal or a part (for example, surface of the cap 25 having the metal plate 253) of the protective member other than a part mounted to the mounting part may be abutting an outer face (for example, the fan cover 203f described later) of the power unit main body.

According to the twelfth aspect, since the connection terminal is supported in at least two points of the mounting part and a part other than the mounting part, it is possible to stably mount the connection terminal to the power unit main body, without applying unreasonable load on the connection terminal or mounting part.

According to a thirteenth aspect of the present invention, in the electrical power unit as described in any one of the tenth to twelfth aspects, the detaching part may be provided continuously to a side face (for example, the side face 240a described later) of the connection terminal.

According to the thirteenth aspect, while maintaining the effect of reinforcing the connection site between the connection terminal and the conductive path member, it is possible to curb to a minimum the influence imparted by the detaching part on the operability (ease of handling) of the connection terminal.

According to a fourteenth aspect of the present invention, in the work machine as described in any of the tenth to thirteenth aspects, the connection terminal may be provided to be capable of attaching and detaching to the mounting part by way of a magnet (for example, the magnet 281 described later).

According to the fourteenth aspect, it is possible to allow the connection terminal to be easily and quickly attached and detached relative to the mounting part of the electrical power unit.

An electrical power unit (for example, the electrical power unit 1, 5, 7, 8 described later) according to a fifteenth aspect of the present invention includes: a power unit main body (for example, the power unit main body 2, 6 described later); an electrical component (for example, the battery 4 described later) which drives the power unit main body; a connection terminal (for example, the connection terminal 24 described later) which is provided to a leading end of a conductive path member (for example, the harness 23 described later) extending from the power unit main body and capable of connecting to the electrical component; and a protective member (for example, the cap 25 described later) capable of protecting the connection terminal, in which the protective member is provided to be capable of attaching and detaching to a protective member mounting part (for example, the second mounting part 28 described later) of the power unit main body.

According to the fifteenth aspect, by protecting the connection terminal by the protective member while removing the connection terminal from the electrical component, it is possible to achieve protection against water, dust of the connection terminal, and it is possible to mount the protective member to the protective member mounting part of the power unit main body while connecting the connection terminal to the electrical component. Furthermore, in a state in which the protective member is mounted to the protective member mounting part, it is possible to prevent the protective member from shaking from the vibrations, etc. of the work machine equipped with the electrical power unit, and becoming hindrance to the operator. For this reason, it is possible to improve the workability at the location of the protective member in the connected state of the connection terminal.

According to a sixteenth aspect of the present invention, in the electrical power unit as described in the fifteenth aspect, the protective member may have a coupling member (for example, the cable 26 described later) which is coupled with the connection terminal.

According to the sixteenth aspect of the present invention, it is possible to prevent the protective member mounted to the protective member mounting part of the power unit main body from mistakenly falling off and being lost. In addition, since it is possible to easily pull in the protective member by hand to the vicinity of the connection terminal using the coupling member, the workability of mounting upon mounting the protective member to the connection terminal also improves.

According to a seventeenth aspect of the present invention, in the electrical power unit as described in the sixteenth aspect, a coupling part (for example, the coupling base 243 described later) of the coupling member in the connection terminal may be provided to span between the connection terminal and the conductive path member.

According to the seventeenth aspect, it is possible to reinforce the connection site between the connection terminal and the conductive path member by the coupling part, and possible to reduce the influence imparted by the coupling part on the operability (ease of handling) of the connection terminal.

According to an eighteenth aspect of the present invention, in the electrical power unit as described in the seventeenth aspect, the coupling part may be provided continuously to a side face (for example, the side face 240a described later) of the connection terminal.

According to the eighteenth aspect, while maintaining the effect of reinforcing the connection site between the connection terminal and the conductive path member, it is possible to curb to a minimum the influence imparted by the coupling part on the operability (ease of handling) of the connection terminal.

According to a nineteenth aspect of the present invention, in the electrical power unit as described in any one of the fifteenth to eighteenth aspects, the protective member may have an insertion opening (for example, the insertion opening 251 described later) into which the connection terminal is inserted, and may be configured to be mountable to the protective member mounting part so that the insertion opening is directed downwards in the direction of gravity.

According to the nineteenth aspect, dust, dirt, water, etc. will not collect inside of the protective member.

According to a twentieth aspect of the present invention, in the electrical power unit as described in any of the fifteenth to nineteenth aspects, the protective member may be provided to be capable of attaching and detaching to the protective member mounting part by a magnet (for example, the magnet 281 described later).

According to the twentieth aspect, it is possible to allow the protective member to be easily and quickly attached and detached relative to the protective member mounting part of the electrical power unit.

An electrical power unit (for example, the electrical power unit 1, 5, 7, 8 described later) according to a twenty-first aspect of the present invention includes: a power unit main body (for example, the power unit main body 2, 6 described later); an electrical component (for example, the battery 4 described later) which drives the power unit main body; a connection terminal (for example, the connection terminal 24 described later) which is provided to a leading end of a conductive path member (for example, the harness 23 described later) extending from the power unit main body and capable of connecting to the electrical component; and a protective member (for example, the cap 25 described later) which is capable of protecting the connection terminal, in which the power unit main body has a common mounting part (for example, the second mounting part 26 described later) capable of attaching and detaching the protective member and the connection terminal.

According to the twenty-first aspect of the present invention, since the power unit main body has the common mounting part, it is possible to mount the protective member and connection terminal to the common mounting part of the power unit main body. For this reason, it is possible to improve the workability at the location of the protective member and connection terminal.

According to a twenty-second aspect of the present invention, in the electrical power unit as described in the twenty-first aspect, the common mounting part may be capable of mounting the protective member when the connection terminal is connecting to the electrical component, and may be provided to be capable of mounting the connection terminal when the connection terminal is removed from the electrical component.

According to the twenty-second aspect, while the connection terminal is connected to the electrical component, it is possible to prevent the protective member from shaking from the vibrations, etc. of the work machine to which the electrical power unit is equipped, and becoming hindrance to the operator. In addition, while the connection terminal is removed from the electrical component, it is possible to prevent the connection terminal from becoming a hindrance to the operator.

A work machine (for example, the work machine 100, 100A described later) according to a twenty-third aspect of the present invention includes: a drive member (for example, the power unit main body 2, 6, power transmission mechanism section 102, excitation mechanism section 103, 105) which is driven by electricity; and an electrical component (for example, the battery 4 described later) for supplying electricity to the drive member; in which the drive member includes at least a power unit main body (for example, the power unit main body 2, 6), and further includes: a connection terminal (for example, the connection terminal 24 described later) which is provided to a leading end of a conductive path member (for example, the harness 23 described later) extending from the power unit main body, and capable of connecting to the electrical component, in which the connection terminal is provided to be capable of attaching and detaching to a mounting part (for example, the first mounting part 38 described later) of the power unit main body.

According to the twenty-third aspect, since it is possible to mount the connection terminal to the mounting part of the power unit main body while removing the connection terminal from the electrical component, it is possible to avoid the risk of the connection terminal mistakenly hitting an external object and damaging, upon transport of the work machine. For this reason, it is possible to improve the workability at the location of the connection terminal in the disconnected state.

According to a twenty-fourth aspect of the present invention, the work machine as described in the twenty-third aspect may further include a protective member (for example, the cap 25 described later) capable of protecting the connection terminal separated from the electrical component.

According to the twenty-fourth aspect, since it is possible to protect the connection terminal by the protective member upon removing the connection terminal from the electrical component, the risk of damage to the connection terminal can be avoided much more.

According to a twenty-fifth aspect of the present invention, the work machine as described in the twenty-third or twenty-fourth aspect may further include a placement member to which the electrical component is detachably provided, in which the mounting part of the power unit main body may be provided to the placement member.

According to the twenty-fifth aspect, due to providing the mounting part to the placement member of the electrical component, it is possible to retain the connection terminal removed from the electrical component close to the electrical component. It is thereby possible to suppress the length of the conductive path member, and thus possible to configure the work machine compactly.

According to a twenty-sixth aspect of the present invention, in the work machine as described in the twenty-fifth aspect, a direction in which the connection terminal is oriented upon the connection terminal being connected to the electrical component, and a direction in which the connection terminal is oriented upon the connection terminal being mounted to the mounting part may be identical directions.

According to the twenty-sixth aspect, it is possible to suppress the length of the conductive path member, and thus possible to configure the work machine compactly.

According to a twenty-seventh aspect of the present invention, in the work machine as described in the twenty-fifth or twenty-sixth aspect, the connection terminal may have a detaching part which is capable of attaching and detaching to the mounting part, the mounting part of the power unit main body may be provided to an upper face of the placement member, and the detaching part may be provided to a side face of the connection terminal disposed in a direction intersecting a projecting direction of a terminal part of the connection terminal upon the connection terminal being connected to the electrical component, or upon the connection terminal being mounted to the mounting part.

According to the twenty-seventh aspect, since it is possible to mount the connection terminal sideways to the power unit main body, upon removing the connection terminal from the electrical component, even if forgetting to mount the protective member to the connection terminal, it is possible to suppress rain water, etc. from infiltrating into the connection terminal.

According to a twenty-eighth aspect of the present invention, in the work machine as described in the twenty-seventh aspect, the upper face of the placement member may be a substantially horizontal surface.

According to the twenty-eighth aspect, upon mounting the connection terminal sideways to the power unit main body, even if forgetting to mount the protective member to the connection terminal, it is possible to further suppress rain water, etc. from infiltrating into the connection terminal.

According to a twenty-ninth aspect of the present invention, in the work machine as described in any one of the twenty-fifth to twenty-eighth aspects, the placement member may have a covering part which is disposed so as to project upwards from a circumference of the electrical component, and the mounting part may be provided to the covering part.

According to the twenty-ninth aspect, it is possible to bring together the connection position of the connection terminal upon the connection terminal being connected to the electrical component, and the mounting position of the connection terminal upon the connection terminal being mounted to the mounting part. For this reason, it is possible to further suppress the length of the conductive path member, and thus possible to configure the work machine upon removing the connection terminal from the electrical component more compactly.

According to a thirtieth aspect of the present invention, in the work machine as described in the twenty-ninth aspect, the mounting part may consist of a recess groove open at an upper face of the covering part, a side farther from the electrical component of the recess groove may be blocked, and the detaching part of the connection terminal may be formed in a protruding shape having a locking part to the recess groove.

According to the thirtieth aspect, it is possible to maintain the connection terminal strongly mounted to the mounting part. Since the mounting part is hardly visible from outside, it is possible to improve the design of the work machine.

According to a thirty-first aspect of the present invention, in the work machine as described in the thirtieth aspect, the placement member may have a placement member main body to which the covering part is mounted at an upper face, the recess groove may have a lateral opening part opened at a side close to the electrical component, and the placement member main body may have a projecting part which is arranged below a bottom of the recess groove and overlaps the lateral opening part in a plan view, and may form a labyrinth structure by the bottom of the recess groove and the projecting part.

According to the thirty-first aspect, upon water splashing on the recess groove, it is possible to weaken the momentum of infiltrating water by the labyrinth structure. For this reason, it is possible to mitigate the water damage effects on components inside of the work machine.

Effects of the Invention

According to the present invention, it is possible to provide an electrical power unit and work machine capable of improving workability at the location of a protective member in the connected state of the connection terminal, and the location of the connection terminal itself in the disconnected state.

PREFERRED MODE FOR CARRYING OUT THE INVENTION

First Embodiment

Figure 1:
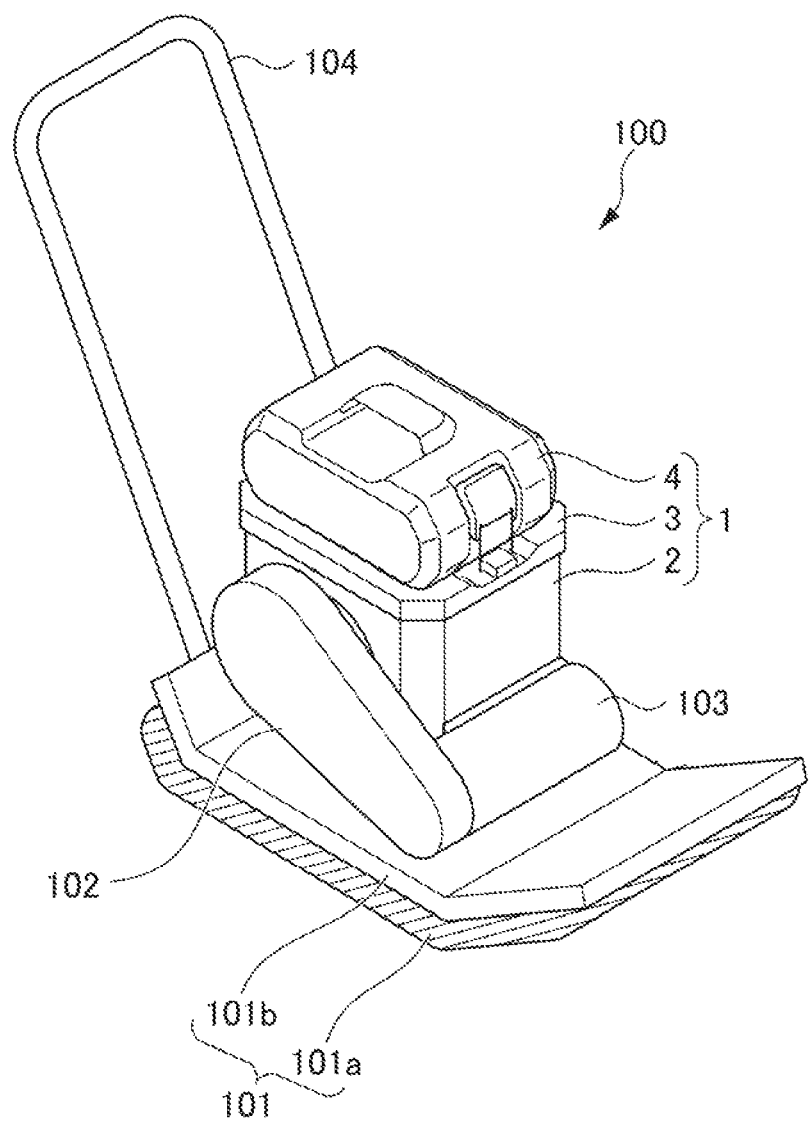
FIG. 1 is a perspective view showing a configuration example of a work machine equipped with an electrical power unit according to a first embodiment.

<Configuration of Work Machine>
First, a first embodiment of an electrical power unit will be explained in detail while referencing the drawings. FIG. 1 is a perspective view showing a configuration example of a work machine equipped with an electrical power unit according to the first embodiment. In the present invention, the specific work machine is in no way limited; however, for example, earth-moving machinery or agricultural machinery such as a ground-leveling device, lawn mower, farm tractor and snow blower can be exemplified. In the present embodiment, a plate compactor which is a form of a ground-leveling device is exemplified as the work machine 100. The work machine 100 is a work machine equipped with an electrical power unit 1 as the power source. In detail, the work machine 100 includes the electrical power unit 1, a working mechanical section 101, a power transmission mechanism section 102, an excitation mechanism section 103, and a handle 104.

The electrical power unit 1 has a power unit main body 2 having a motor (not illustrated in FIG. 1), a battery tray 3 provided at the top of this power unit main body 2, and a battery 4 which installed on this battery tray 3 and is a driving source that drives the power unit main body 2. The configuration of this electrical power unit. 1 will be explained in further detail at a later stage.

The working mechanism section 101 is a part performing rolling compaction of the ground mainly, and is one embodiment of a contact patch member. The working mechanism section 101 has a rolling plate 101*a* which contacts the ground, and a base 101*b* arranged on the top face of this rolling plate 101*a*. The electrical power unit 1 is mounted on the top face of the base 101*b*. The power transmission mechanism section 102 transmits the rotative power of the motor possessed by the power unit main body 2, to the excitation mechanism section 103 via power transmission members such as a belt or chain (not illustrated).

The excitation mechanism section 103 has an eccentric load (not illustrated) which is coupled with the power transmission mechanism section 102 to be able to transmit power. The excitation mechanism section 103 causes the rolling plate 101*a* of the working mechanism section 101 to shake vertically to generate a compacting force on the ground, by causing the eccentric load to rotate by the rotative power of the motor transmitted by the power transmission mechanism section 102, and generates compaction force on the ground.

It should be noted that this power unit main body 2, power transmission mechanism section 102 and excitation mechanism section 103 are embodiments of a driving member for driving the contact patch member by way of electricity. The handle 104 is configured in a bar shape which can be gripped by an operator in a standing state. The operator can thereby perform compacting work on the ground, while pushing the work machine 100 by the handle 104.

<Configuration of Electrical Power Unit>

Figure 2:
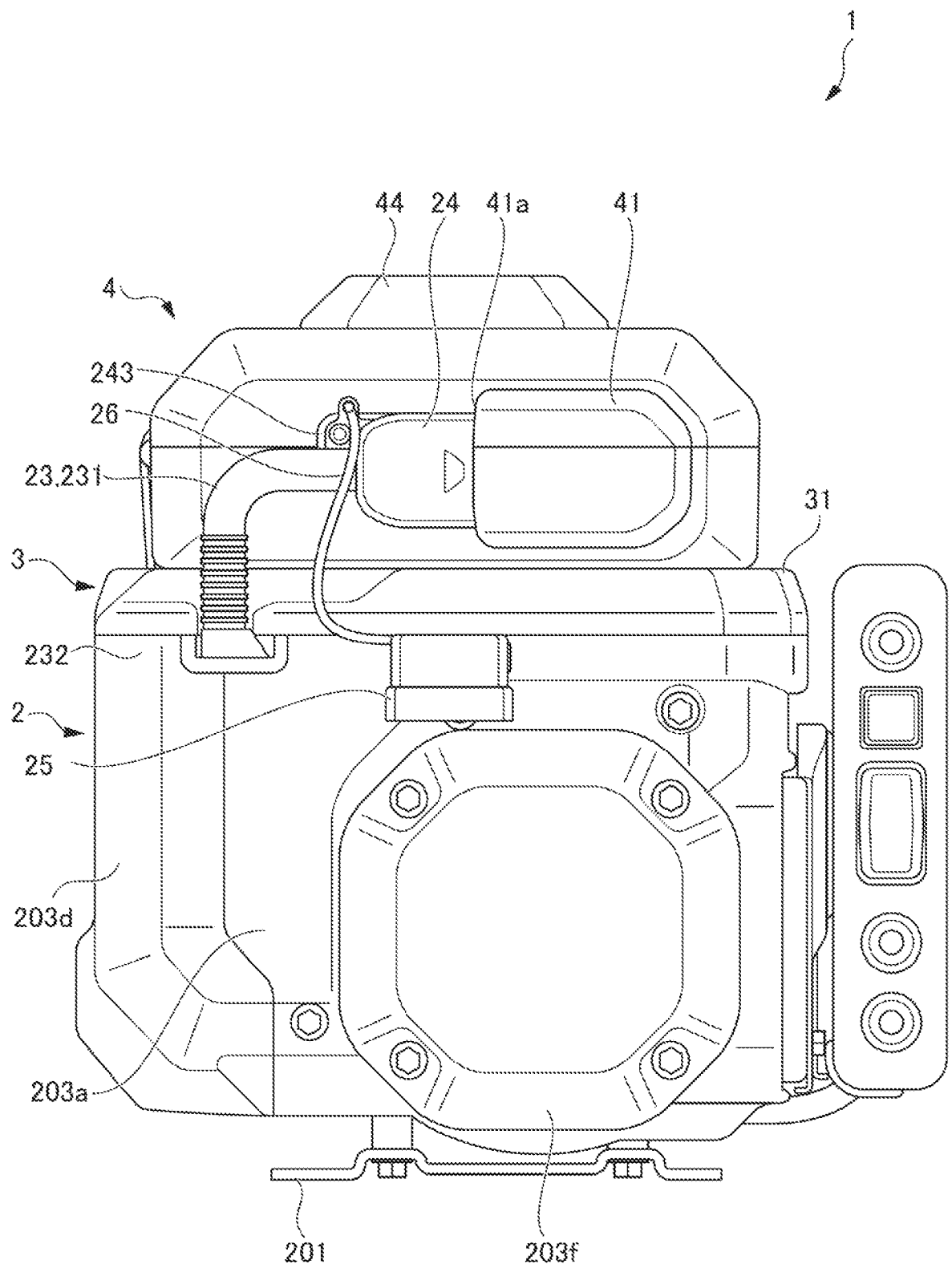
FIG. 2 is a front view of the electrical power unit according to the first embodiment.
Figure 3:
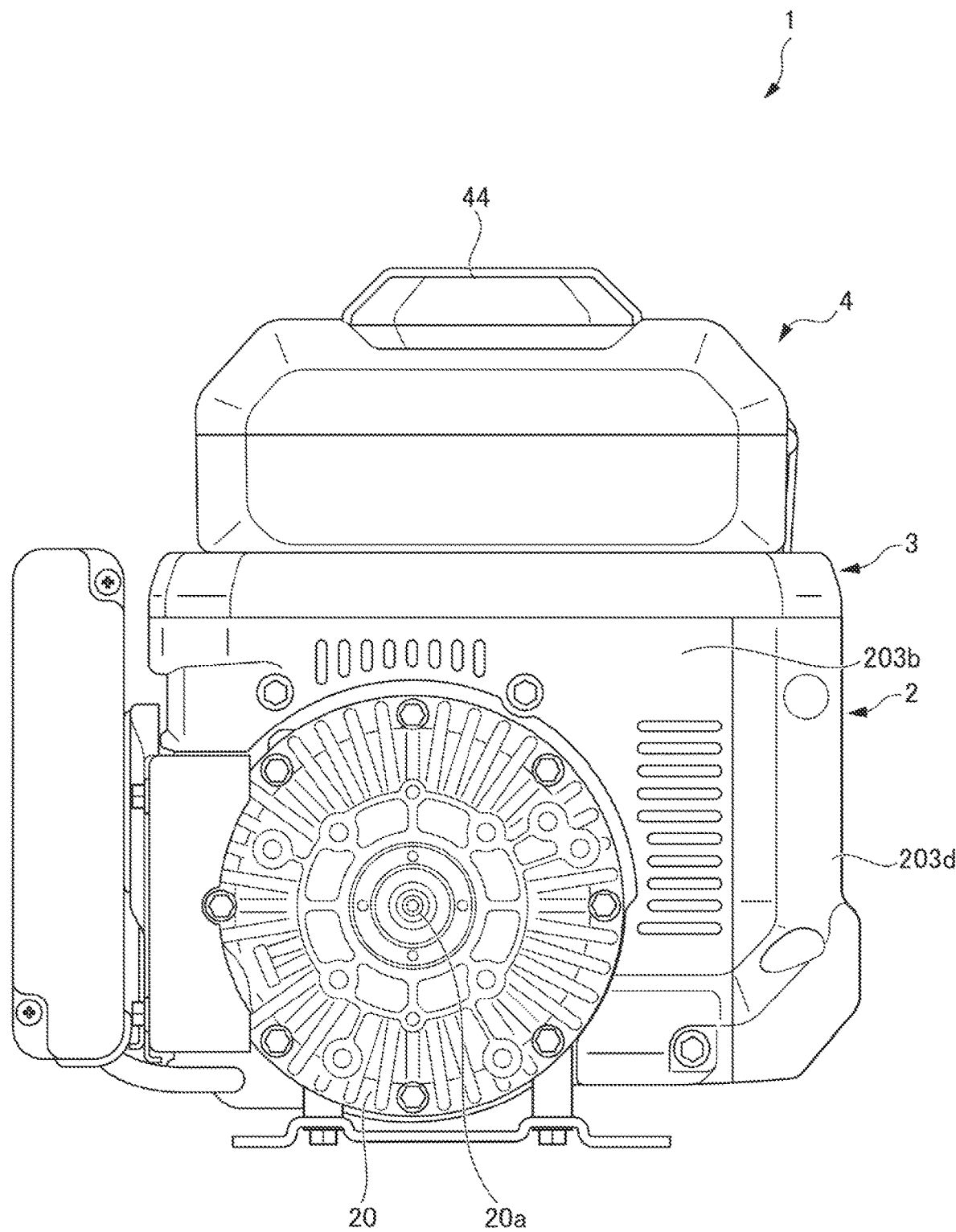
FIG. 3 is a back view of the electrical power unit according to the first embodiment.
Figure 4:
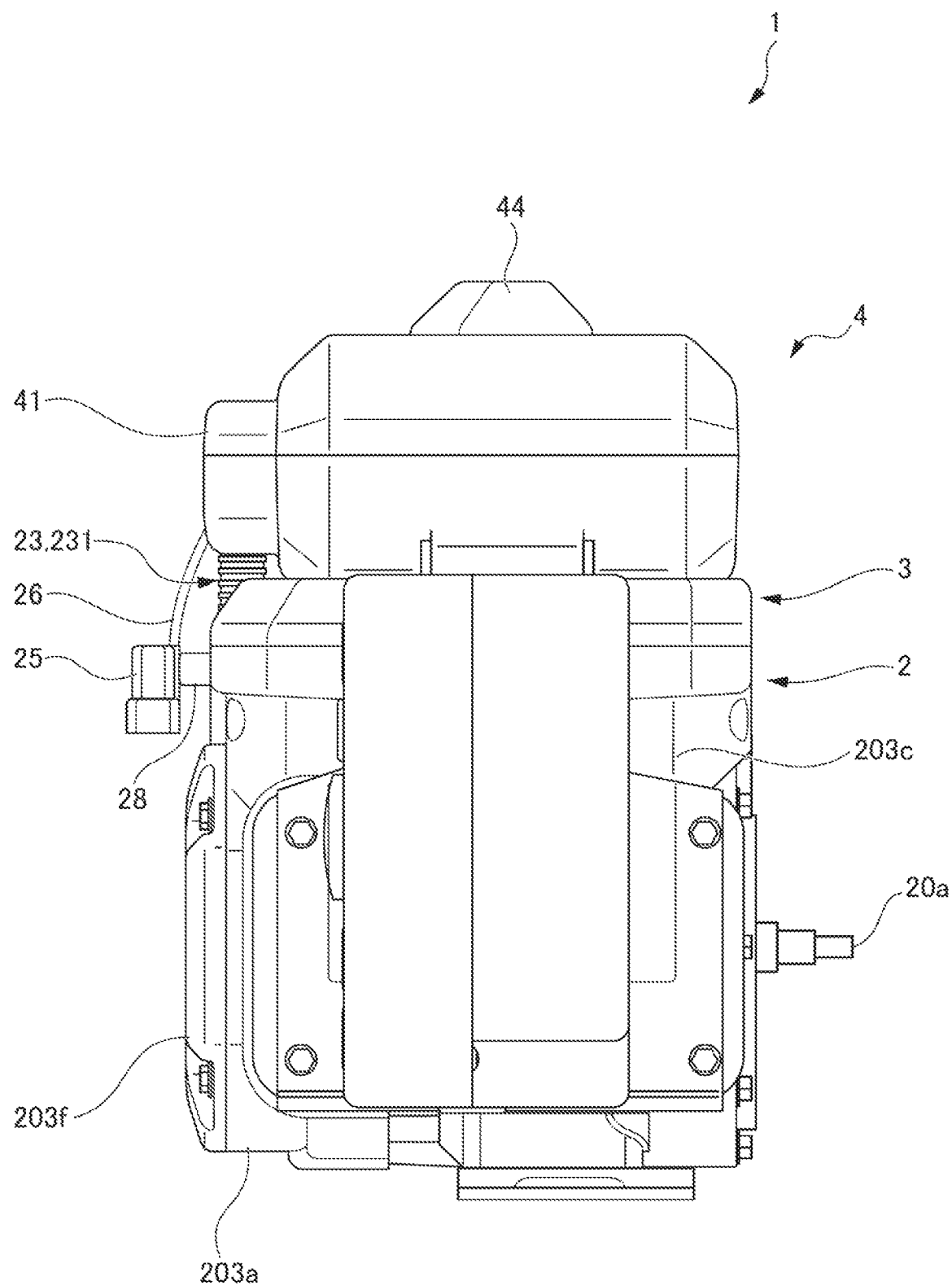
FIG. 4 is a right-side view of the electrical power unit according to the first embodiment.
Figure 5:
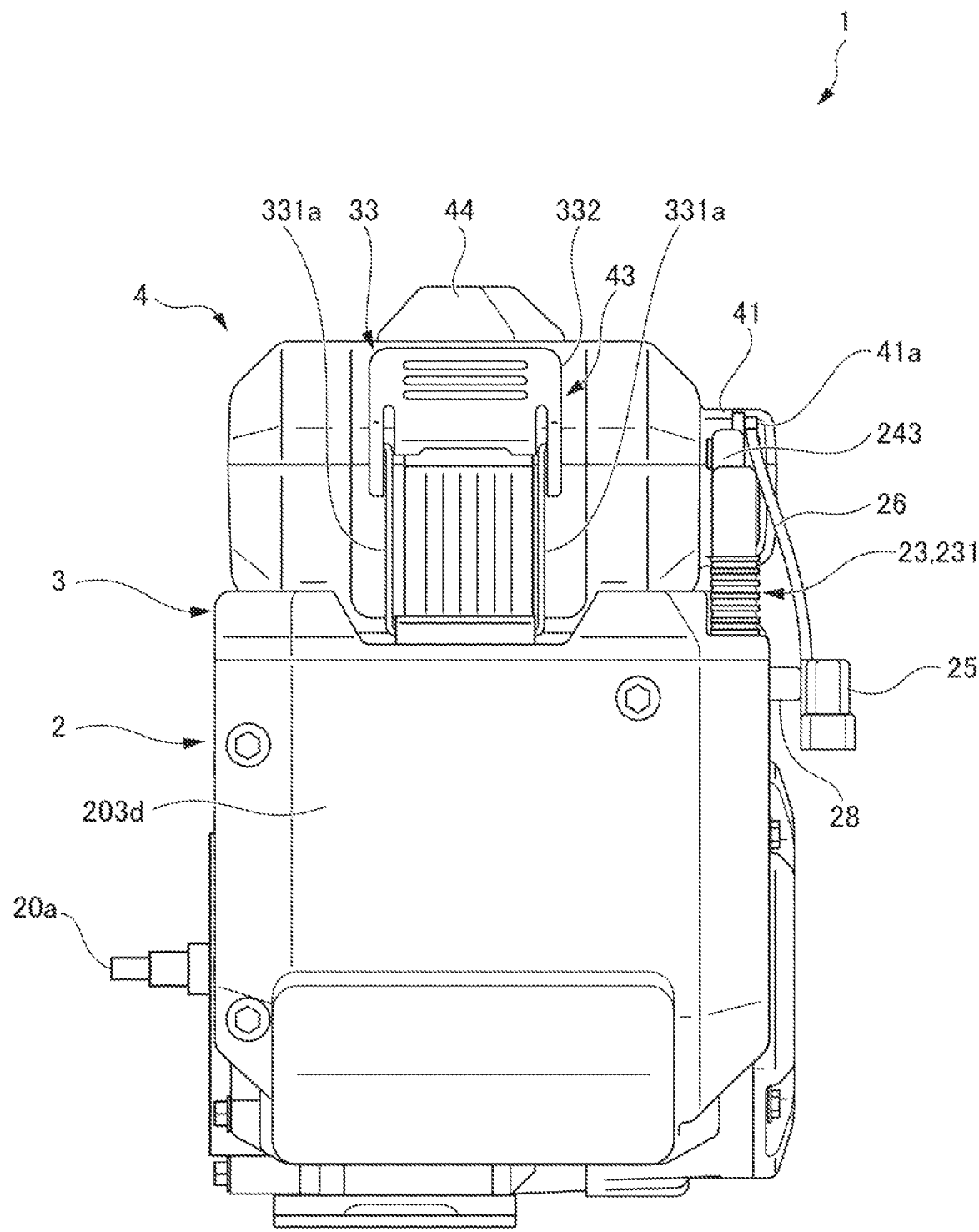
FIG. 5 is a left-side view of the electrical power unit according to the first embodiment.
Figure 6:
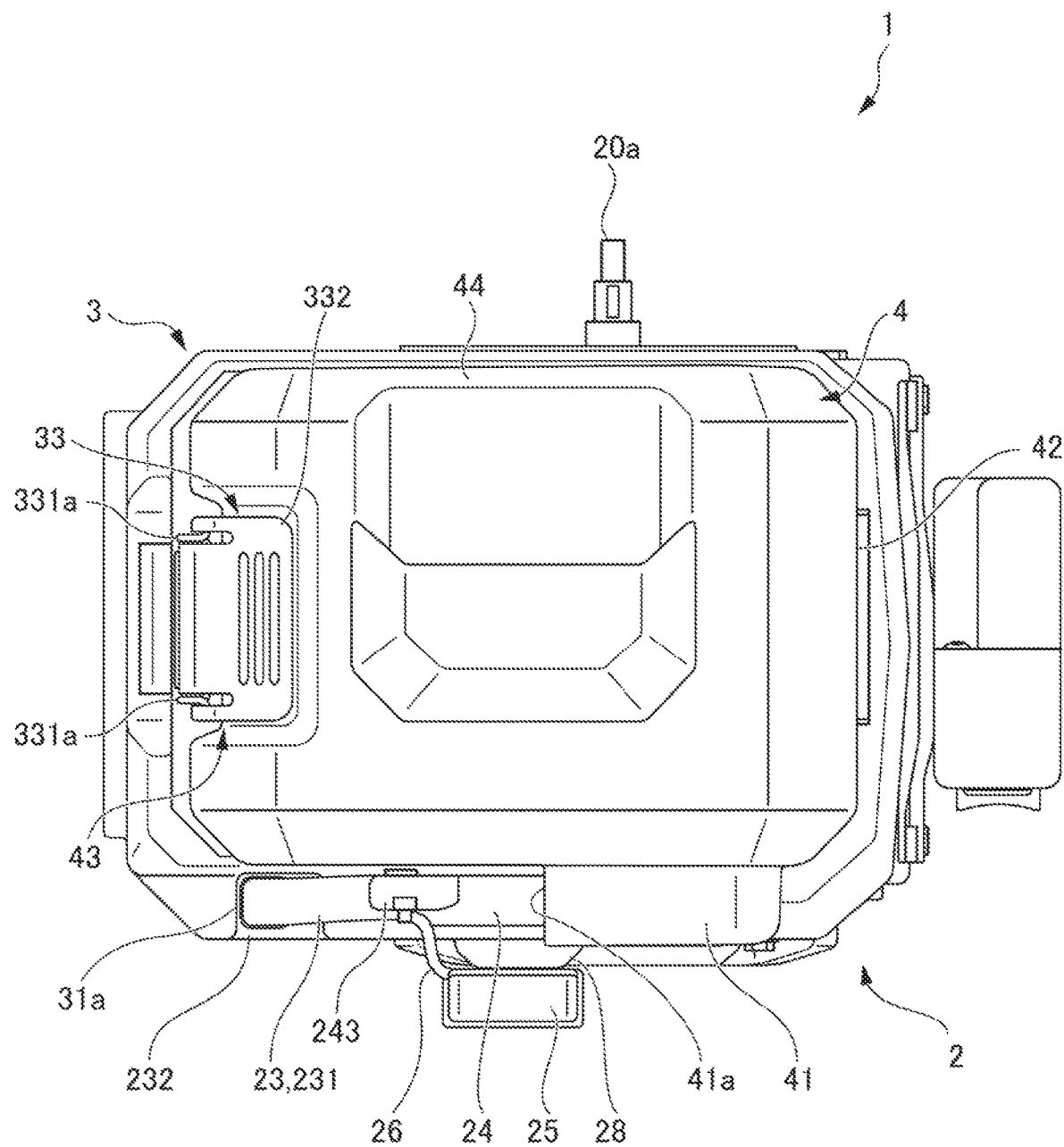
FIG. 6 is a plan view of the electrical power unit according to the first embodiment.
Figure 7:
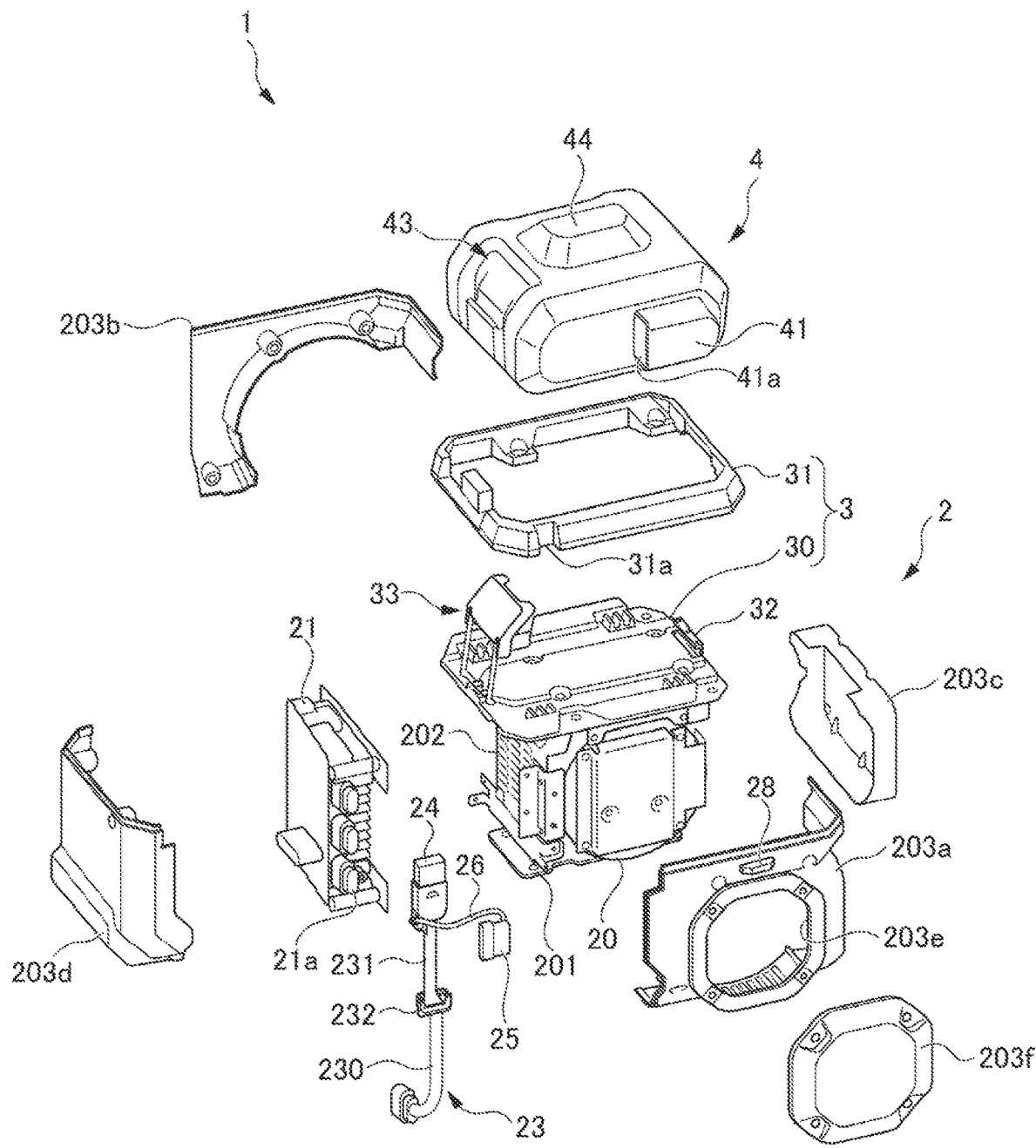
FIG. 7 is an exploded perspective view of the electrical power unit according to the first embodiment.

Next, the configuration of the electrical power unit 1 will be explained. FIG. 2 is a front view of the electrical power unit according to the first embodiment. FIG. 3 is a back view of the electrical power unit according to the first embodiment. FIG. 4 is a right-side view of the electrical power unit according to the first embodiment. FIG. 5 is a left-side view of the electrical power unit according to the first embodiment. FIG. 6 is a plan view of the electrical power unit according to the first embodiment. FIG. 7 is an exploded perspective view of the electrical power unit according to the first embodiment. It should be noted that, in FIG. 7, fastening members such as screws and bolts for mounting each member are omitted from illustration.

(Overall Configuration of Electrical Power Unit)

The electrical power unit 1 has the power unit main body 2, battery tray 3 and battery 4. This power unit main body 2 has a motor 20, and PDU (Power Delivery Unit) 21. The motor 20 is mounted on a base plate 201 for mounting the power unit main body 2 on the base 101*b* of the working mechanism section 101, directing the output shaft (rotary shaft) 20*a* to the back side of the electrical power unit 1.

The PDU 21 is for power distribution controlling the electric power from the battery 4 to the motor 20 in the power unit main body 2 and other electrical components. The PDU 21 is mounted to a support frame 202 provided from the base plate 201 over to the side and top faces of the motor 20. The PDU 21 has a plurality of connection parts, and a harness 23 having connection terminal 24 for electrically connecting with the battery 4 and introducing the electric power from the battery 4 to the PDU 21 is connected to one connection part 21*a* thereamong. It should be noted that a harness for supplying electric power introduced via the connection terminal 24 and harness 23 to the motor 20, or a harness for electrically connecting with another electrical component such as sensors is connected to the PDU 21; however, these harnesses are omitted from illustration in FIG. 7.

The circumference of the motor 20 is covered by a front motor cover 203*a*, a rear motor cover 203*b*, a right-side motor cover 203*c* and a left-side motor cover 203*d*. These motor covers 203*a* to 203*d* constitute a housing which covers the side faces of the power unit main body 2. The PDU 21 is accommodated between the left-side motor cover 203*d* and support frame 202. In addition, the harness 23 connected to the PDU 21 is also accommodated inside of the front motor cover 203*a* and left-side motor cover 203*d*. The front motor cover 203*a* has a gas uptake port 203*e* for a cooling fan arranged at the front side of the motor 20. The gas uptake port 203*e* is covered by a fan cover 203*f*.

(Battery Tray)

The battery tray 3 is for placing the battery 4 and mounting on the power unit main body 2, and is an embodiment of a placement member which places and fixes the battery 4. The battery tray 3 of the present embodiment has a rectangular tray main body 30 as a placement member main body mounted on the upper face of the support frame 202, and a rectangular frame-like decorative cover 31 as a covering part mounted on the upper surface of the tray main body 30 so as to surround the outer circumference of the tray main body 30.

The decorative cover 31 is made of resin, and is provided so as to project upwards from the circumferential edge part of the upper face of the tray main body 30 and surround the lower outer circumference of the battery 4 placed on the battery tray 3. The upper face 31*b* of the decorative cover 31 is formed to be a flat, substantially level surface. A part of the outer circumference on the front side of the decorative cover 31 constitutes a harness drawing part 31*a* which communicates with the inside of the front motor cover 203*a* and left-side motor cover 203*d*, by being formed so as to partially recess. The harness drawing part 31*a* is arranged at a position biased to the left side in a front view relative to the PDU 21, at the front side of the power unit main body 2. The harness 23 accommodated inside of the front motor cover 203*a* and left-side motor cover 203*d* is drawn to the outside from this harness drawing part 31*a* to above the power unit main body 2.

Figure 8:
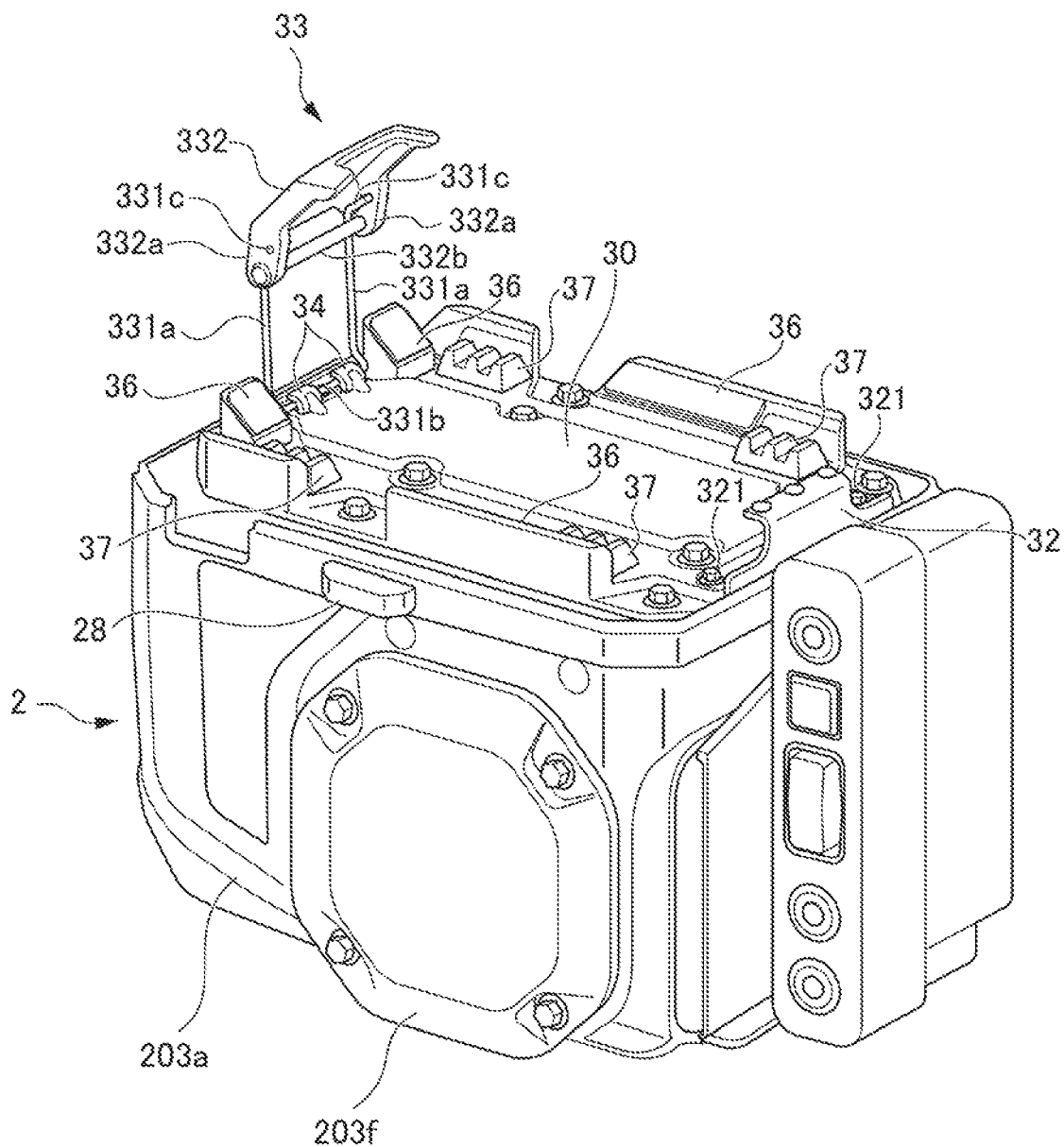
FIG. 8 is a perspective view showing the electrical power unit according to the first embodiment from which a decorative cover of the battery and battery tray were removed.
Figure 9:
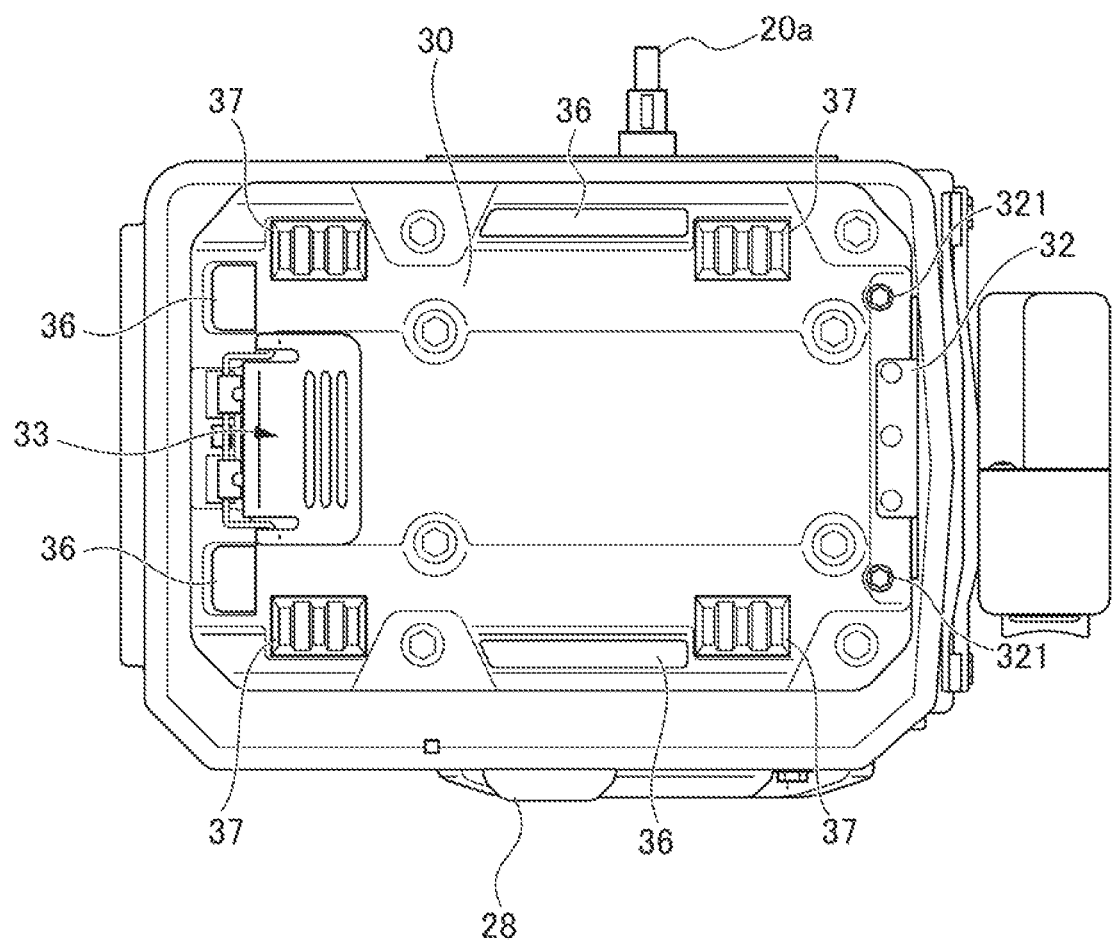
FIG. 9 is a plan view showing the electrical power unit shown in FIG. 8.
Figure 10:
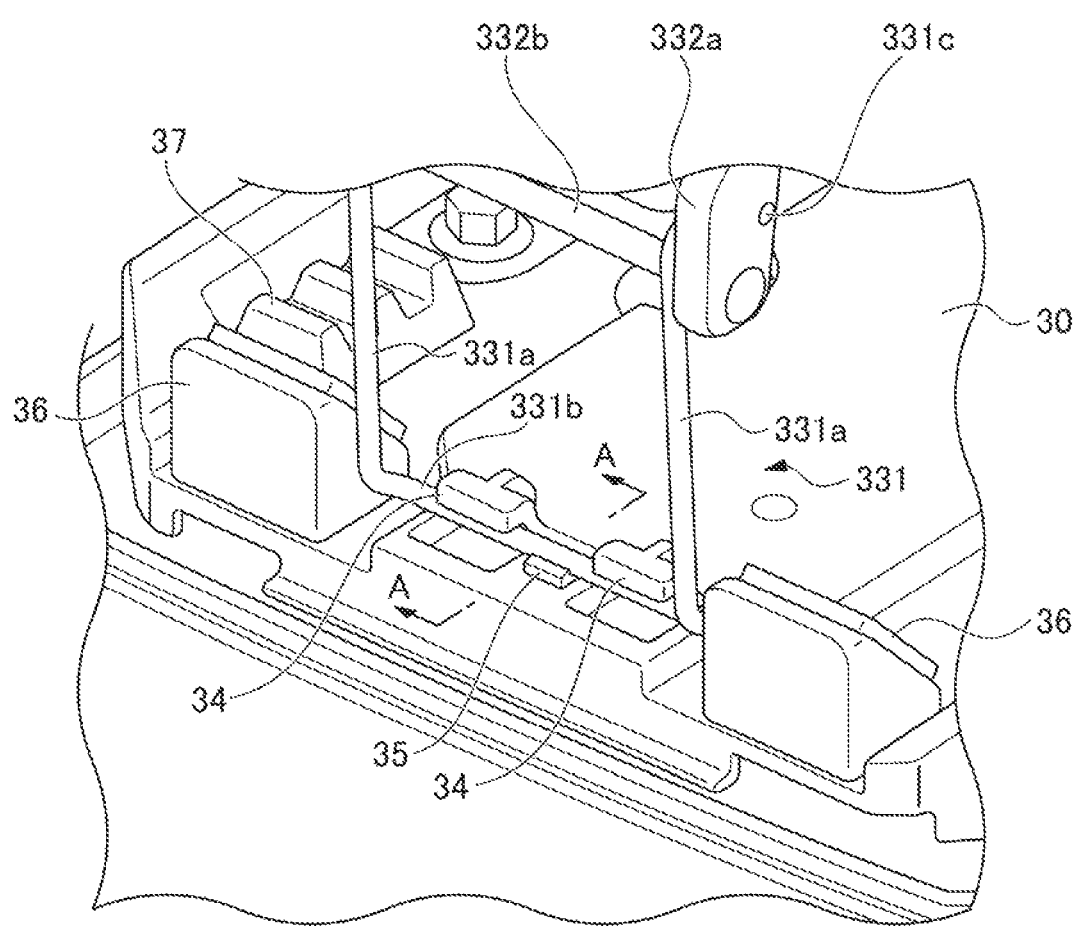
FIG. 10 is a perspective view showing a mounting site between an engagement member and tray main body to be enlarged.
Figure 11:
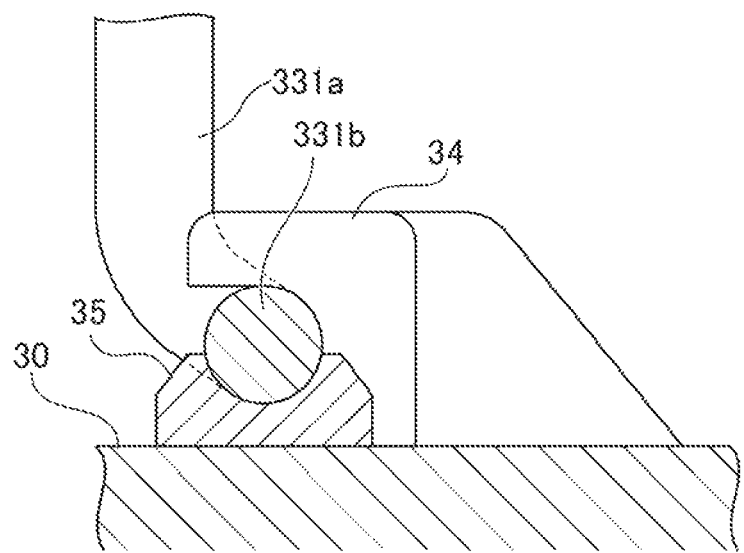
FIG. 11 is a cross-sectional view along the line A-A in FIG. 10.
Figure 12:
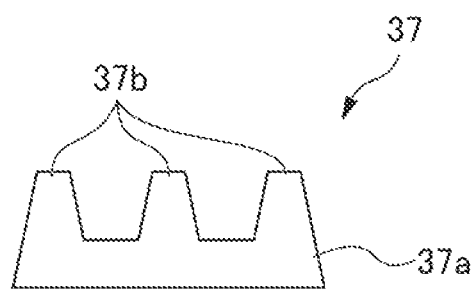
FIG. 12 is a front view showing an elastic member provided on a battery tray.

The configuration of the battery tray 3 will be explained in further detail by referencing FIGS. 8 to 12. FIG. 8 is a perspective view showing the electrical power unit from which the battery and the decorative cover of battery tray have been removed. FIG. 9 is a plan view showing the electrical power unit shown in FIG. 8. FIG. 10 is a perspective view showing a mounting site between an engagement member and tray main body to be enlarged. FIG. 11 is a cross-sectional view along the line A-A in FIG. 10. FIG. 12 is a front view showing an elastic member provided on the battery tray.

On the top face of the tray main body 30 of the battery tray 3, along with a retaining part 32 being provided at one end in the left/right direction (right end when viewing the power unit main body 2 from the front), a buckle 33 is provide to the other end (left end when viewing the power unit main body 2 from the front). This buckle 33 is an embodiment of an engaging member which engages with the battery 4 to fix to the battery tray 3.

The retaining part 32 is for locking one end of the battery 4 to retain to the battery tray 3, and is provided so as to stand up in a reverse L shape towards the center of the tray main body 30. The retaining part 32 is detachably mounted to the tray main body 30 by fastening members 321 such as screws and bolts illustrated in FIG. 8.

The buckle 33 is for engaging to the battery 4 and fixing the battery 4 to the battery tray 3 along with the retaining part 32, and has a movable part 331 provided swingably to the tray main body 30, and a lever part 332 provided rotatably continuously to the leading end of this movable part 331.

The movable part 331 has a pair of parallel wire sections 331a, 331a extending linearly, and a shaft section 331b connecting lower ends of the wire sections 331a, 331a, and is formed by bending a metal wire of circular cross section. The leading ends of the wire sections 331a, 331a constitute mounting shafts 331c, 331c to the lever part 332, by bending towards the retaining part 32, and the leading end thereof further bending to both sides, in a state standing on the tray main body 30. In addition, the shaft section 331b of the movable part 331 is locked by a pair of hook claws 34, 34 projecting on the top face of the tray main body 30. The movable part 331 is thereby swingably mounted in the left/right direction of the power unit main body 2 (direction approaching or distancing relative to the retaining part 32).

The lever part 332 is an embodiment of pressing part which presses the battery 4. The lever part 332 has a pair of support legs 332a, 332a at the lower end. To these support legs 332a, 332a, the mounting shafts 331c, 331c of the movable part 331 are mounted so as to penetrate from inside to outside of the support legs 332a, 332a. The lever part 332 is thereby mounted rotatably around the mounting shafts 331c, 331c at the leading end of the movable part 331. In addition, the lever part 332 has one rod-shaped locking shaft 332b spanning the pair of support legs 332a, 332a, at a position more to the lower end side than the mounting site of the mounting shafts 331c, 331c, and closer to a center side (closer to tray main body 30) than the wire sections 331a, 331a.

As shown in FIG. 10 and FIG. 11, a resistance member 35 which generates resistance by way of friction during swinging of the movable part 331 around the shaft section 331b is provided between the pair of hook claws 34, 34 provided to the tray main body 30. Generally, the resistance member 35 is formed by a member having elasticity or flexibility such as rubber or resin, and is provided so as to interpose the shaft section 331b of the movable part 331 relative to the battery tray 3 between the hook claws 34, 34. By way of this resistance member 35, it is possible to easily convey the work machine 100, due to the buckle 33 being able to suppress unintended swinging such as during conveyance of the work machine 100 after the battery 4 has been removed from the battery tray 3. In addition, by appropriately changing the resistance value (shape, material) of the resistance member 35, it is possible to provisionally fix the buckle 33 at a position of an arbitrary swing angle, without making so that the buckle 33 unintentionally collapses due to its own weight. For this reason, it is possible to improve the workability upon mounting the battery 4 to the battery tray 3.

As shown in FIG. 8 and FIG. 9, an appropriate number of guide support parts 36 for guiding and supporting the battery 4 are provided to project at the outer circumference on the tray main body 30. The guide support parts 36 are respectively arranged at each long side (front side and back side) on the top face of the tray main body 30, and respectively arranged so as to sandwich the buckle 33 on the short side (left side) on which the buckle 33 is arranged on the top face of the tray main body 30. The surface of each guide support part 36 is made as a sloped face which slopes towards the central side of the tray main body 30. A buffer material consisting of rubber, resin or the like is provided on the surface of the sloped face. For this reason, upon the battery 4 being placed on the battery tray 3, the battery 4 is supported from the lower face side and guided to a suitable position at the center of the tray main body 30 naturally by these guide support parts 36.

In the tray main body 30, a plurality of elastic members 37 consisting of an elastic material such as rubber or resin, for example, is provided somewhat more to the center than the guide support parts 36. The elastic member 37, upon the battery 4 being placed on the battery tray 3, elastically supports the battery 4 by elastically deforming to accept the load of the battery 4. The elastic member 37 of the present embodiment has a base 37a mounted on the tray main body 30, and a plurality of protrusions 37b which are provided to project on the top of the base 37a, as shown in FIG. 12. Between adjacent protrusions 37b, 37b are separated by a width substantially the same as the protrusion 37b. Each protrusion 37b is formed in a tapered shape as moving upwards, and comes to be able to easily bend upon receiving the load of the battery 4. In addition, since the side of the base 37a of the elastic member 37 is wide, it comes to be possible to cause an appropriate elastic repulsive force to act on the battery 4.

(Battery)

Figure 13:
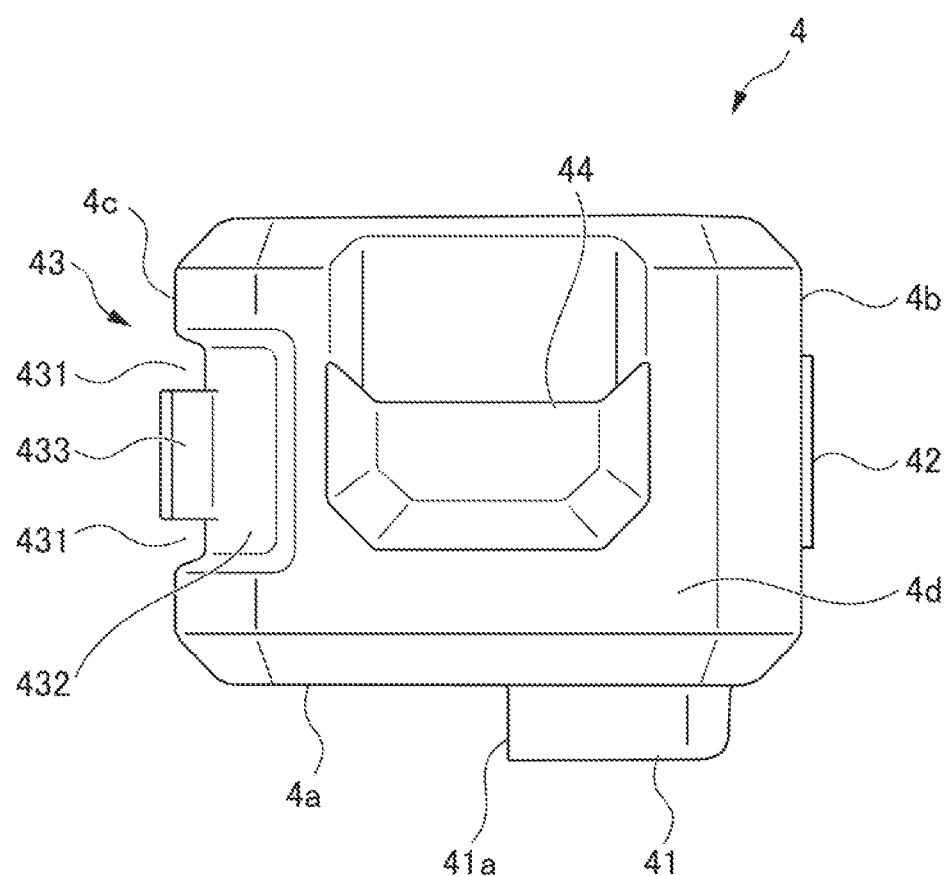
FIG. 13 is a plan view of a battery.
Figure 14:
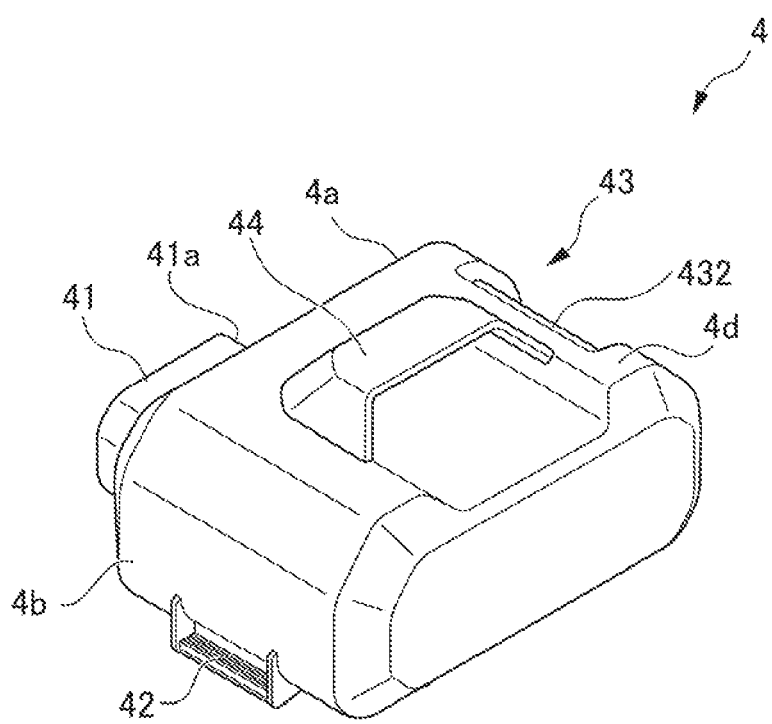
FIG. 14 is a perspective view looking at a right side of the battery from a back side.
Figure 15:
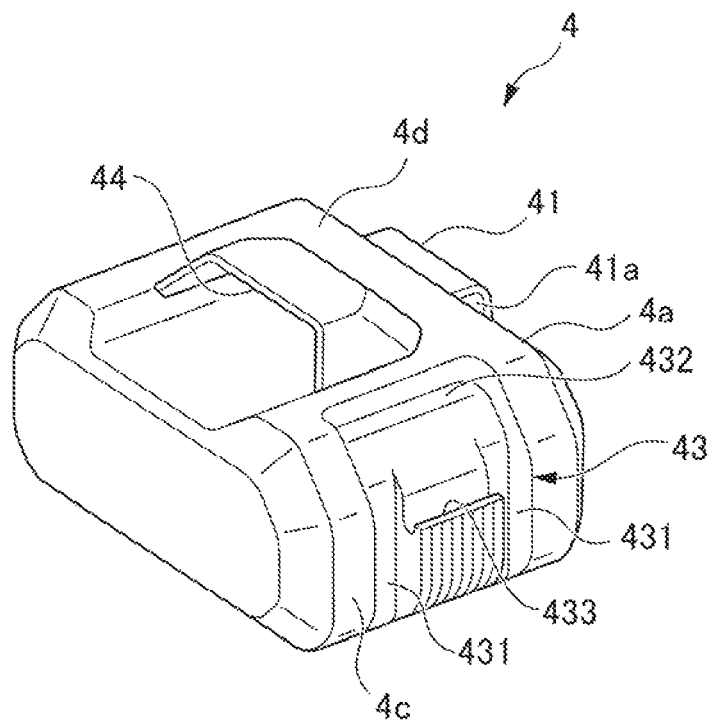
FIG. 15 is a perspective view looking at a left side of the battery from a back side.

Next, the configuration of the battery 4 will be further explained using FIGS. 13 to 15. FIG. 13 is a plan view of the battery according to the embodiment. FIG. 14 is a perspective view looking at the right side of the battery according to the embodiment from the back side. FIG. 15 is a perspective view looking at the left side of the battery according to the embodiment from the back side. The battery 4 of the present embodiment has a substantially rectangular parallelepiped shape, and is detachably provided to the battery tray 3 on the top of the power unit main body 2. This battery 4 is an embodiment of an electrical component which drives the power unit main body 2.

A connection part 41 for accommodating the connection terminal 24 provided to the leading end of the harness 23 and connecting with a connector part (not illustrated) in the battery 4 is provided to the battery 4 so as to project forwards. The connection part 41 is arranged at the front face 4a of the battery 4, and has an opening part 41a into which the connection terminal 24 is inserted, in a direction in which the harness 23 and connection terminal 24 are arranged (left direction in FIG. 2), in a state in which the battery 4 is mounted on the battery tray 3.

As shown in FIG. 14, a locking groove 42 is provided to the lower part of the right face 4b of the battery 4. The locking groove 42 causes the battery 4 to lock to the retaining part 32, by accepting the leading end of the retaining part 32 on the tray main body 30. In addition, as shown in FIG. 15, an engaged part 43 which engages with the buckle 33 on the tray main body 30 is provided from the left face 4a of the battery 4 directly opposing with the locking groove 42 towards the top face 4d. The engaged part 43 has a pair of first storing recesses 431, 431 which can store the pair of wire sections 331a, 331a of the movable part 331 of the buckle 33, and a second storing recess 432 which is continuous with the upper end of the first storing recesses 431, 431 and can store the lever part 332 of the buckle 33. Between the pair of first storing recesses 431, 431, a shaft locking part 433 which can lock the locking shaft 332b of the buckle 33 is provided. The first storing recesses 431, 431 are provided to the left face 4c of the battery 4, and the second storing recess 432 is provide from the left face 4c of the battery 4 to the top face 4d. Furthermore, a handle part 44 upon transporting the battery 4 is provided to the top face 4d of the battery 4.

(Harness and Connection Terminal)

In the present embodiment, as shown in FIG. 7, the harness 23 electrically connecting the power unit main body 2 and battery 4 has a first portion 230 which is stored inside of the power unit main body 2 and electrically connected with a connection part 21a of the PDU 21, and a second portion 231 which is drawn from the power unit main body 2 to outside and extends to the battery 4. The harness 23 is configured to be easily bendable in any direction. In the middle of the harness 23, one seal part 232 made of resin is provided so as to surround in a wall shape the outer circumference of the harness 23. As shown in FIG. 2, the seal part 232 is installed so as to fit with the front motor cover 203a and left-side motor cover 203d, and is arranged so that the second portion 231 of the harness 23 passes through the harness drawing part 31a provided in the decorative cover 31 of the battery tray 3. The harness drawing part 31a is thereby sealed by the seal part 232, and contamination such as dust, dirt and rain is prevented from infiltrating to inside of the power unit main body 2 along the outer surface of the second portion 231 of the harness 23. This harness 23 is an embodiment of a conductive path member extending from the power unit main body 2.

Figure 16:
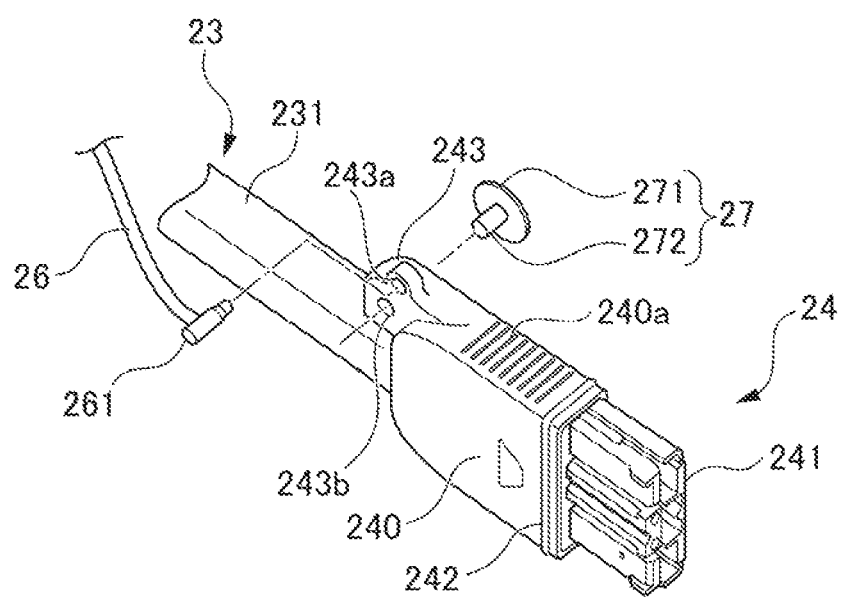
FIG. 16 is a perspective view showing a connection terminal.

The connection terminal 24 is connected to the leading end of the second portion 231 of the harness 23. The configuration of this connection terminal 24 will be explained using FIG. 16. FIG. 16 is a perspective view showing a connection terminal according to the embodiment. The connection terminal 24 has a connection terminal main body 240 made of resin, and a terminal part 241 which projects from the leading end of the connection terminal main body 240. The connection terminal main body 240 is formed to be sufficiently wider than the harness 23, so as to be easily gripped by the operator. The terminal part 241 is a site carrying out electrical connection to the connector part (not illustrated) in the battery 4 through the opening part 41a of the battery 4. FIG. 2 and FIGS. 4 to 6 show a state in which the connection terminal 24 is electrically connected through the opening part 41a of the battery 4 (useable state of electrical power unit 1). In this state, the harness 23 causes the second portion 231 extending upwards from the harness drawing part 31a of the battery tray 3 in a substantially right-angle direction towards the opening part 41a of the battery 4, and inserts the connection terminal 24 at the leading end to inside of the opening part 41 to connect to the connector part (not illustrated) on the interior.

In this way, the electrical power unit 1 shown in the present embodiment is configured so as to electrically connect between the battery 4, which is the driving source of the power unit main body 2, and the power unit main body 2 via the harness 23 extending from the power unit main body 2 to the battery 4 and the connection terminal 24. The electrical power unit 1 thereby becomes able to electrically connect the power unit main body 2 and battery 4 directly without going through the battery tray 3. Since it is unnecessary to provide a terminal for electrical connection with the battery 4 on the battery tray 3, it is possible to improve the layout degrees of freedom in the constituent components including the battery 4 (for example, handle 104, etc. of the work machine 100), without the mounting direction of the battery 4 being restricted. In addition, upon mounting the battery 4 to the battery tray 3, since it is unnecessary to worry about damage of the terminal, it is also possible to perform mounting of the battery 4 comfortably. Furthermore, since it is possible to arrange the power unit main body 2 and battery 4 to be near via the battery tray 3, shortening of the harness 23 is also possible.

(Battery Mounting Method)

Figure 17:
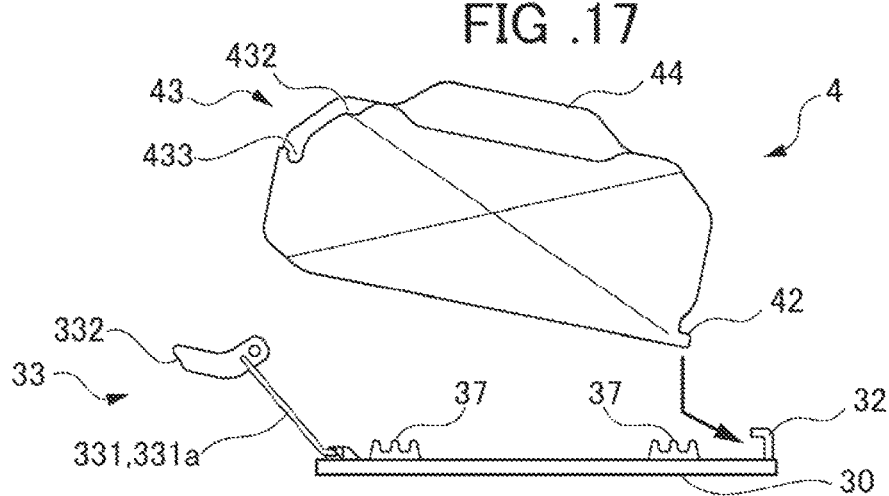
FIG. 17 is an explanatory view illustrating a method of mounting the battery to the battery tray.
Figure 18:
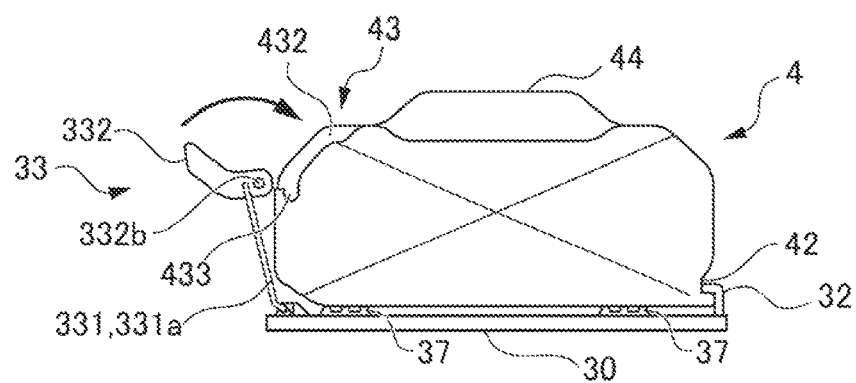
FIG. 18 is an explanatory view illustrating a method of mounting the battery to the battery tray.
Figure 19:
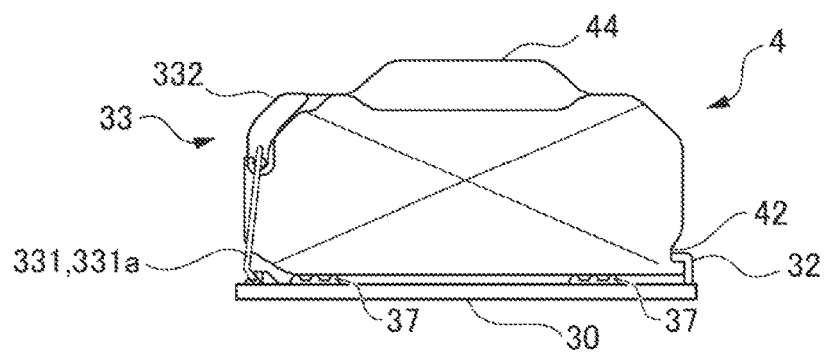
FIG. 19 is an explanatory view illustrating a method of mounting the battery to the battery tray.

Herein, the method of mounting the battery 4 to the battery tray 3 in the present embodiment will be explained using FIGS. 17 to 19. FIGS. 17 to 19 are explanatory drawings illustrating a method of installing the battery to the battery tray.

(1) Holding the handle part 44 of the battery 4 and orienting a side having the locking groove 42 to the side of the retaining part 32, the battery 4 is conveyed over the tray main body 30 in a posture such that a side of the locking groove 42 is somewhat sloped downwards, and the locking groove 42 of the battery 4 is locked to the retaining part 32. At this time, the buckle 33 is arranged in a state stopping at a position of any swing angle that does not hinder carrying in the battery 4 (FIG. 4).

(2) After locking the locking groove 42 of the battery 4 to the retaining part 32, the battery 4 is placed on the tray main body 30. The battery 4 is naturally guided to a predetermined placement location in the central part of the tray main body 30 by the plurality of guide support parts 36. At this time, the battery 4 is tightly fixed to the tray main body 30, by the elastic member 37 elastically deforming appropriately by receiving the load of the battery 4. Subsequently, the locking shaft 332b of the buckle 33 is hooked to the shaft locking part 433 of the battery 4, and the lever part 332 of the buckle 33 is rotated to the side of the battery 4 and accommodated inside the engaged part 43 (FIG. 18).

(3) When accommodating the lever part 332 of the buckle 33 within the engaged part 43 of the battery 4, the locking shaft 332b of the buckle 33 presses the shaft locking part 433 of the battery 4 downwards by the elasticity of the wire sections 331a, 331a of the moveable part 331. The battery 4 is thereby fixed to the battery tray 3 (FIG. 19). At this time, since the elastic repulsive force of the elastically deformed elastic member 37 acts on the battery 4, it is possible to fix the battery 4 without shuttering. For this reason, the battery 4 and battery tray 3 are suppressed from moving relatively upon vibration or the like acting on the battery 4, and abrasion is suppressed from arising between the battery 4 and battery tray 3.

After the battery 4 is fixed to the battery tray 3 in the above way, the power unit main body 2 becomes drivable by the connection terminal 24 being connected to the battery 4, as shown in FIG. 2. In other words, the battery 4 and power unit main body 2 are directly electrically connected by the harness 23 having the connection terminal 24.

(Cap)

Figure 20:
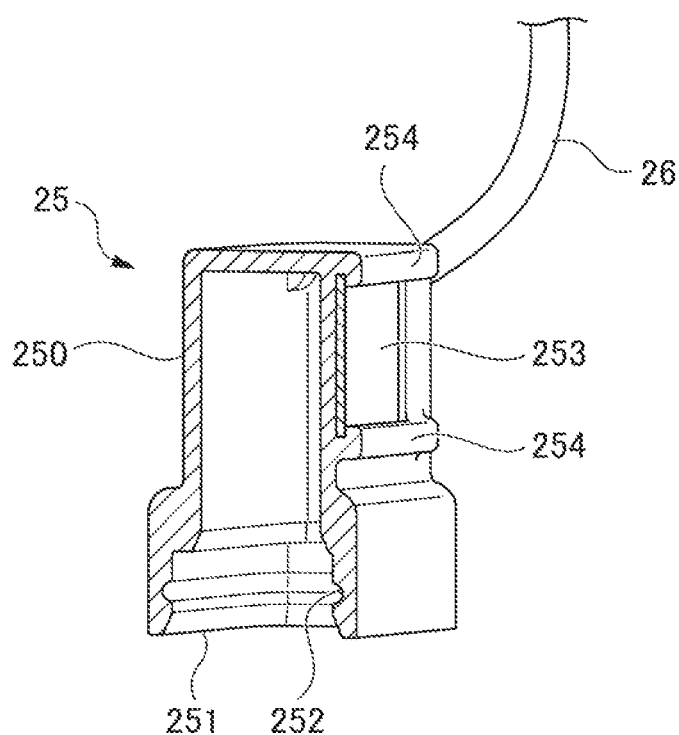
FIG. 20 is a perspective view showing a cap in a cross section.
Figure 21:
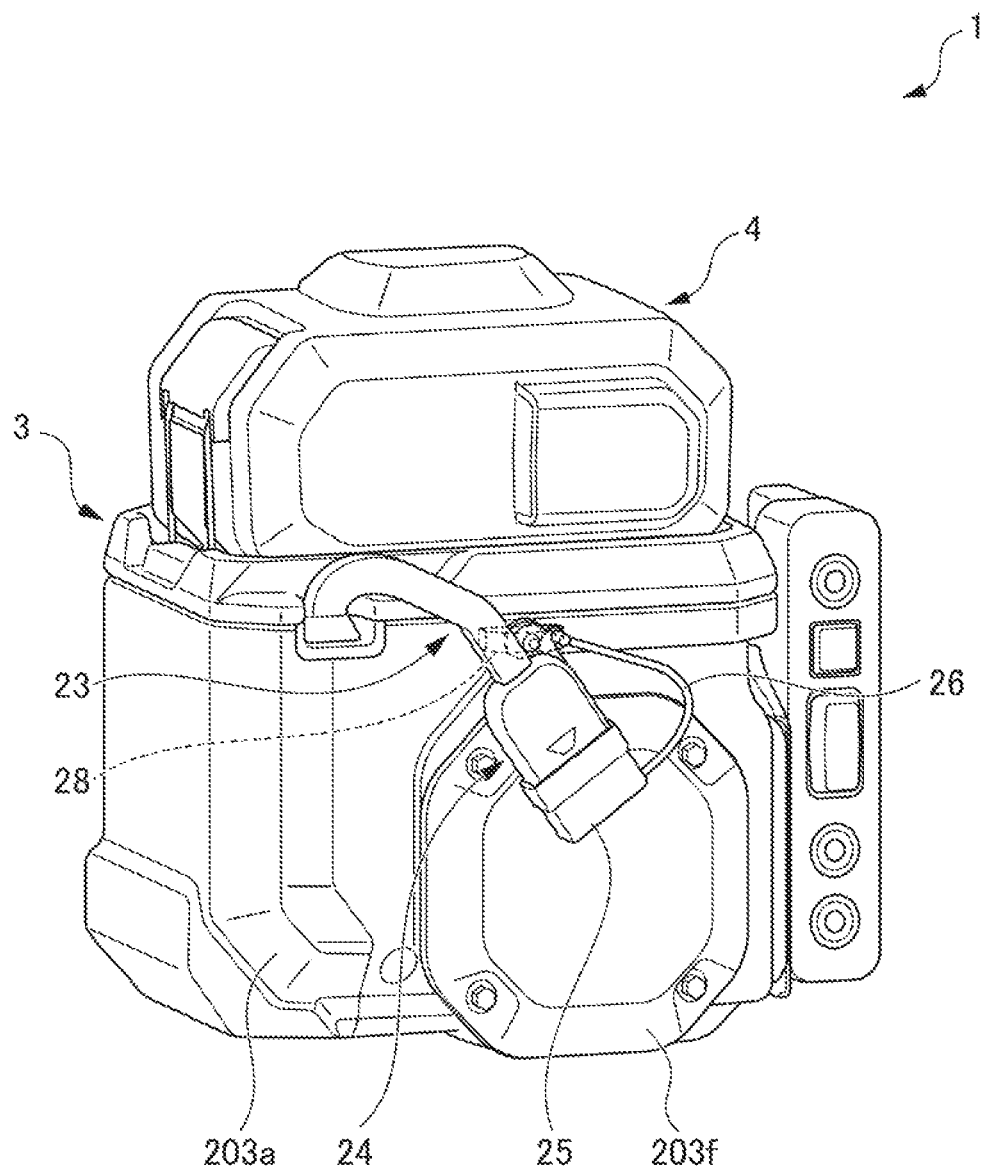
FIG. 21 is a perspective view of the electrical power unit according to the first embodiment showing an aspect of protecting the connection terminal by a cap.

As shown in FIG. 7, the connection terminal 24 has a cap 25 which can protect the terminal part 241 upon removing from the battery 4. This cap 25 will be further explained using FIG. 20 and FIG. 21. FIG. 20 is a perspective view showing the cap according to the embodiment in a cross section. FIG. 21 is a perspective view of the electrical power unit showing an aspect of protecting the connection terminal by the cap. The cap 25 is formed in a bottomed container shape which can be mounted so as to be put on and cover the terminal part 241 of the connection terminal 24, from a material having elasticity and flexibility such as rubber or resin, for example. This cap 25 is an embodiment of a protective member which protects the connection terminal 24.

The cap 25 is formed in a bottomed container shape having a cap main body 250, and an insertion opening 251 which is arranged in one surface of the cap main body 250 and opens in a rectangular shape into which the terminal part 241 of the connection terminal 24 can be inserted. While removing the connection terminal 24 from the battery 4, as shown in FIG. 21, by putting the cap 25 on the terminal part 241 of the connection terminal 24, it is possible to achieve protection of the connection terminal 24, and specifically, prevention of contamination by dust, dirt and water or damage.

A recess groove 252 spanning the entire circumference is provided to the inner circumference of the insertion opening 251 of the cap 25. The recess groove 252, upon the cap 25 being mounted to the terminal part 241 of the connection terminal 24, is configured so as to elastically engage to a projecting ridge part 242 (refer to FIG. 16) provided over a part or the entirety of the outer circumferential surface of the connection terminal main body 240. The cap 25 is thereby configured so as to be retained to the connection terminal 24 and not to easily come off, upon being mounted to the connection terminal 24.

A rectangular metal plate 253, which can be attracted by a magnet, is provided to one side face of the cap main body 250, as shown in FIG. 20. The metal plate 253 is locked by locking edges 254, 254 provided to side faces of the cap main body 250, and is mounted to the cap main body 250 so as to expose a majority thereof to the outside. However, the mounting structure of the metal plate 253 is not limited thereto, and may be adhered to the cap main body 250 by adhesive, or may be fixed to the cap main body 250 using a fastening member such as screws. In addition, the metal plate 253 may be integrally buried inside of the cap main body 250.

(Cable)

The cap 25 has a cable 26 which is coupled with the connection terminal 24. This cable 26 is an embodiment of a coupling member. The cable 26, for example, is formed in a string shape having flexibility by the same material as the material constituting the cap 25 or another appropriate material, for example, and couples between the cap main body 250 and a coupling base 243 provided to the connection terminal 24. The cap 25 is thereby made in a state always coupled to the connection terminal 24 by the cable 26. For this reason, upon removing the connection terminal 24 from the battery 4, it is possible to easily pull in the cap 25 by hand using the cable 26. It is thereby possible to improve the workability upon mounting the cap 25 to the connection terminal 24.

Herein, the coupling base 243 of the connection terminal 24 will be further explained. As shown in FIG. 16, the coupling base 243 is provided to span the connection terminal 24 and the second portion 231 of the harness 23. In detail, the coupling base 243 continues to one side face 240a serving as a grip part of the connection terminal main body 240, and extends from this side face 240a to the second portion 231 in the vicinity of the connection site with the connection terminal 24. The side face 240a of this connection terminal main body 240 is a side face arranged so as to face upwards, in a state in which the connection terminal 24 is connected to the battery 4, as shown in FIG. 2.

The coupling base 243 has a shape overhanging laterally from a surface of the second portion 231 in the vicinity of the connecting site with the connection terminal 24 until the same position as the one side face 240a of the connection terminal 24. By this coupling base 243 being provided spanning the connection terminal 24 and the harness 23, the connection site between the connection terminal 24 and harness 23 is reinforced, and it is possible to lower the influence imparted on the operability (ease of handling) of the connection terminal 24. In addition, as shown in FIG. 2, since the coupling base 243 is arranged on an upper side in a state in which the connection terminal 24 is connected to the battery 4, upon connecting the connection terminal 24 to the battery 4, by marking that this coupling base 243 is arranged on the upper side, it is possible to perform the insertion operation of the connection terminal 24 without fail. Furthermore, the coupling base 243 of the present embodiment is provided continuously to one side face 240a serving as a grip part of the connection terminal 24; therefore, while maintaining the effect of reinforcing the connection site between the connection terminal 24 and harness 23, it is possible to curb to a minimum the influence imparted by the coupling base 243 on the operability (ease of handling) of the connection terminal 24.

The coupling base 243 has a cable mounting hole 243a for linking the cable 26. The cable mounting hole 243a is formed to penetrate a site at which a part of the coupling base 243 projects to a side. The cable 26 has a connecting axis 261 of a short cylindrical shape at the opposite end to the coupling end with the cap 25, and this connecting axis 261 is mounted to the cable mounting hole 243a from a front side by a means such as press fitting, heat staking, bonding and screwing. In other words, from the viewpoint of the cap 25 being coupled to the connection terminal 24 via the cable 26, the coupling base 243 shows an embodiment of a coupling part of the cable 26 (coupling member) in the connection terminal 24.

Other than the cable 26, a pin 27 made of metal which can be attracted by a magnet is mounted to the coupling base 243. In the pin 27 of the present embodiment, a mounting protrusion 272 projects from a face of a disk-like pin main body 271. The mounting protrusion 272 is mounted to the pin mounting hole 243b formed to penetrate the coupling base 243 from a back side by a means such as press fitting, bonding and screwing.

(Mounting Part)

Figure 22:
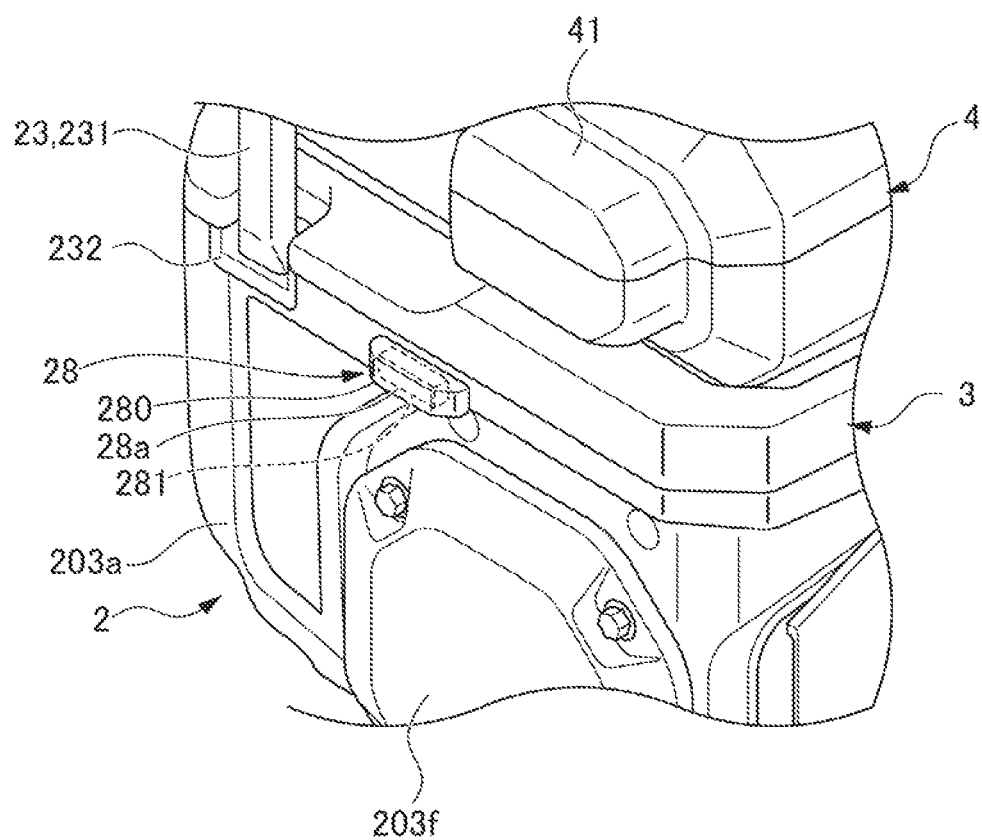
FIG. 22 is a perspective view showing main parts of the electrical power unit according to the first embodiment.
Figure 23:
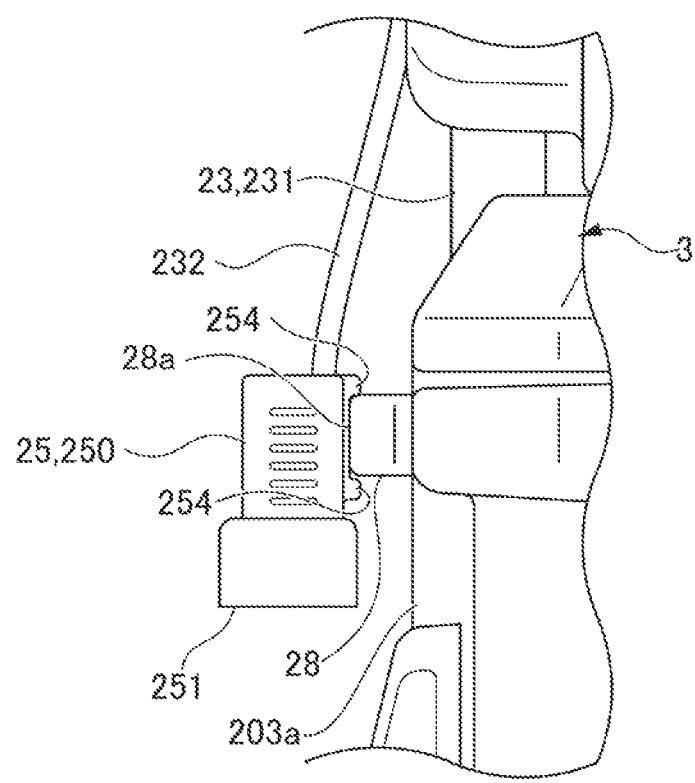
FIG. 23 is a right-side view showing main parts of the electrical power unit according to the first embodiment showing a state mounting the cap to a protective member mounting part.

The cap 25 of the present embodiment is configured to be detachable to a second mounting part 28 of the power unit main body 2. This second mounting part 28 will be further explained using FIGS. 22 and 23. FIG. 22 is a perspective view showing main parts of the electrical power unit. FIG. 23 is a right-side view showing main parts of the electrical power unit showing a state mounting the cap to the mounting part. The second mounting part 28 of the present embodiment is provided at substantially the central part on the upper end of the front motor cover 203a of the power unit main body 2. The second mounting part 28 is configured by a magnet 281 being housed inside of the cover member 280 made of rubber or resin provided to project by a predetermined projecting amount from the outer surface of the front motor cover 203a. A leading end face 28a of the second mounting part 28 becomes a flat surface of rectangular shape. The surface area of this leading end face 28a is substantially the same as the surface area of the metal plate 253 (surface area of portion of the cap 25 exposed to outside) provided to the cap 25. In addition, the leading end face 28a of the second mounting part 28 is equally provided in the area between the locking edges 254, 254; therefore, it is possible to provide the leading end face 28a so as to abut the inner face of each locking edge 254, 254, and possible to prevent falling off of the cap 25 much more.

The cap 25 is magnetically attracted by abutting a surface having the metal plate 253 to the second mounting part 28 to be mounted to the second mounting part 28. Therefore, the second mounting part 28 can also be considered to be a protective member mounting part, in the viewpoint of mounting the cap 25, which is a protective member. As shown in FIG. 2 and FIG. 23, while connecting the connection terminal 24 to the battery 4, it is thereby possible to mount the cap 25 to the second mounting part 28 of the power unit main body 2, and prevent loss of the cap 25. Furthermore, it is possible to prevent the cap 25 from being shaken by vibrations, etc. of the work machine 100 to which the electrical power unit 1 is equipped, and becoming a hindrance to the operator. For this reason, the electrical power unit 1 of the present embodiment and the work machine 100 equipped with this are able to improve workability at the location of the cap 25 in the connected state of the connection terminal 24.

The second mounting part 28 of the present embodiment attracts the cap 25 by way of the magnet 281, and thus can allow the cap 25 to be easily and quickly attached and detached. The cap 25 mounted to the second mounting part 28 can be easily removed from the second mounting part 28, by separating against the attractive force of the magnet 281. In addition, the cap 25 of the present embodiment, due to being coupled to the connection terminal 24 by the cable 26, can prevent loss of the cap 25 also in the case of the cap 25 mistakenly falling off from the second mounting part 28.

It should be noted that, as shown in FIG. 2 and FIG. 23, the cap 25 is configured to be mountable to the second mounting part 28 so that the insertion opening 251 is oriented downwards in the direction of gravity. In other words, as shown in FIG. 2, in a state in which the connection terminal 24 is connected to the battery 4, the cable 26 is set to a sufficient length required to make the cap 25 face downwards and mountable to the second mounting part 28. By the cap 25 being mounted to the second mounting part 28 downwards in this way, upon mounting the cap 25 to the connection terminal 24 without dust, dirt, water, etc. gathering inside of the cap 25, there is no concern of contaminating the terminal part 241.

(Regarding State of Cap Mounted to Connection Terminal)

Figure 24:
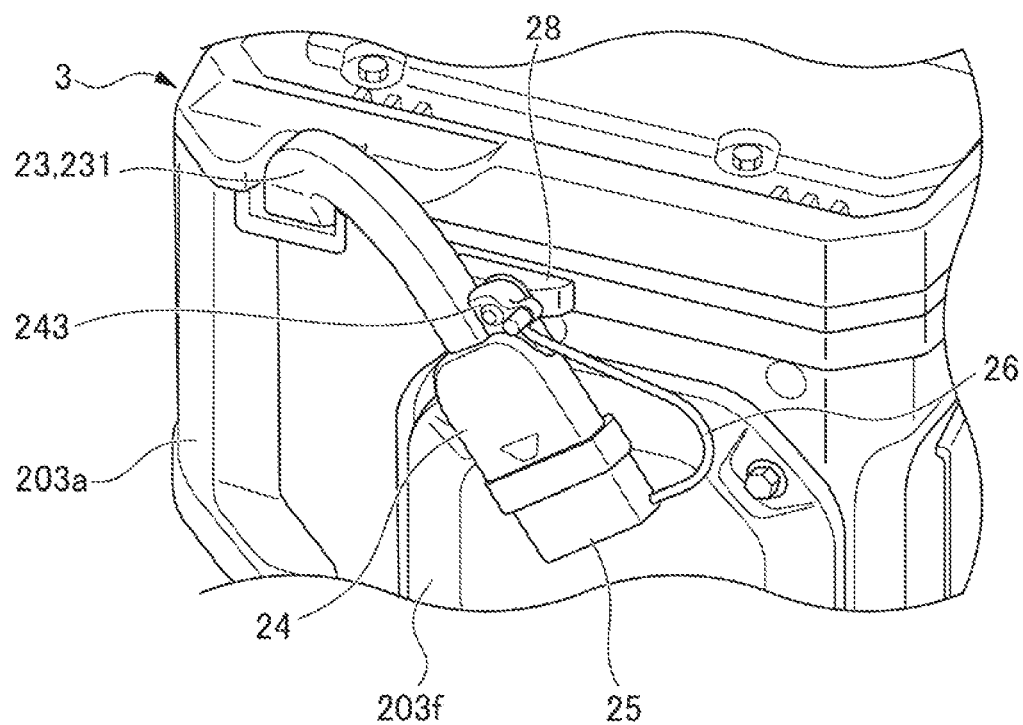
FIG. 24 is a perspective view showing main parts of the electrical power unit according to the first embodiment showing a state removing the connection terminal from the battery.
Figure 25:
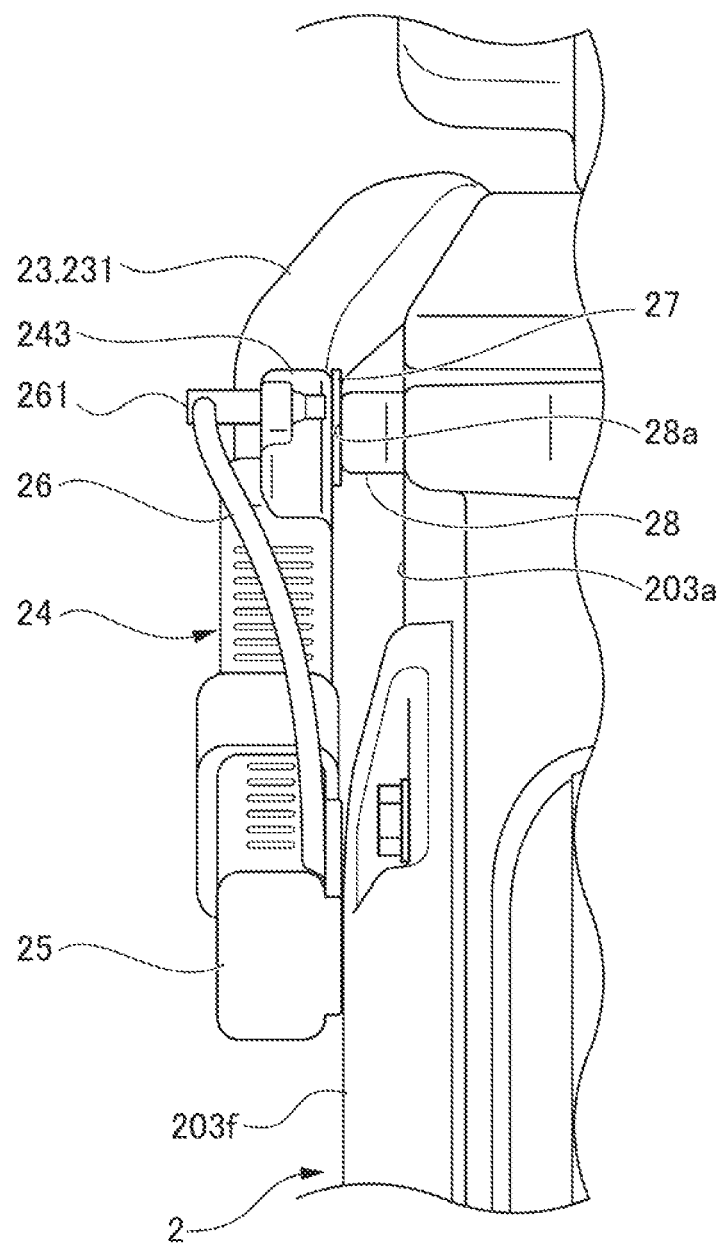
FIG. 25 is a right-side view showing main parts of the electrical power unit according to the first embodiment showing a state removing the connection terminal from the battery.

Using FIG. 24 and FIG. 25, a case of mounting the cap 25 to the connection terminal 24 will be further explained. FIG. 24 is a perspective view showing main parts of the electrical power unit showing a state removing the connection terminal from the battery. FIG. 25 is a right-side view showing the main parts of the electrical power unit showing a state removing the connection terminal from the battery. The connection terminal 24 of the present embodiment is made detachable relative to the second mounting part 28 of the power unit main body 2, in a state removed from the battery 4. Therefore, this second mounting part 28 can also be considered as a common mounting part in the viewpoint of being able to detachably mount commonly both the connection terminal 24 and cap 25.

As shown in FIG. 24 and FIG. 25, the cap 25 for protecting the terminal part 241 is mounted to the connection terminal 24 of the present embodiment, while removing from the battery 4. The connection terminal 24 is detachably mounted to the second mounting part 28 of the power unit main body 2, in a state in which the cap 25 is mounted. In detail, as shown in FIG. 16, the pin 27 made of metal is mounted to the coupling base 243 of the connection terminal 24. The connection terminal 24 removed from the battery 4, as shown in FIG. 24, causes the pin 27 to abut the second mounting part 28, by bending the harness 23 downwards using the flexibility of the second portion 231. The second mounting part 28 retains the connection terminal 24 by attracting the pin 27 by way of the magnet 281 on the inside.

In this way, while removing the connection terminal 24 from the battery 4, since it is possible to mount the connection terminal 24 to the second mounting part 28 of the power unit main body 2, during conveyance of the electrical power unit 1 itself or the work machine 100 equipped with the electrical power unit 1, it is possible to avoid the risk of the connection terminal 24 mistakenly hitting an external object, or the like and being damaged. For this reason, it is possible to improve the workability at the location of the connection terminal 24 in the disconnected state. In addition, the connection terminal 24 magnetically attracted to the second mounting part 28 is able to be easily removed by separating from the second mounting part 28 against the attractive force of the magnet 281.

It should be noted that the pin 27 of the connection terminal 24 magnetically attached to the second mounting part 28 is provided to the coupling base 243 of the connection terminal 24, as shown in FIG. 16. Therefore, from the viewpoint of detachably mounting the connection terminal 24 to the second mounting part 28, the coupling base 243 shows an embodiment of a second detaching part of the connection terminal 24 relative to the second mounting part 28.

With the coupling base 243, due to being provided to span between the connection terminal 24 and harness 23 as mentioned above, the connection site between the connection terminal 24 and harness 23 is reinforced, and can reduce the influence imparted on operability (ease of handling) of the connection terminal 24. In addition, with the coupling base 243 of the present embodiment, due to being provided continuously to one side face 240a serving as the grip part of the connection terminal 24, it is possible to curb to a minimum the influence imparted by the coupling base 243 on the operability (ease of handling) of the connection terminal 24, while maintaining the effect of reinforcing the connection site between the connection terminal 24 and harness 23. Furthermore, with the second mounting part 28 of the present embodiment, due to attracting the connection terminal 24 by way of the magnet 281, it is possible to allow the connection terminal 24 to attach and detach from the battery 4 easily and quickly detached.

As shown in FIG. 25, in a state in which the connection terminal 24 protected by the cap 25 is mounted to the second mounting part 28, a part of the cap 25 is abutting the outer face of the power unit main body 2. In detail, a surface of the cap 25 having the metal plate 253 is abutting the outer surface of the fan cover 203f mounted to the front motor cover 203a. At this time, the pin 27 of the connection terminal 24 and second mounting part 28 are mounted in surface contact normally, without the surface of the pin 27 sloping relative to the leading end face 28a of the second mounting part 28. In other words, the height at which the second mounting part 28 projects towards the front of the power unit main body 2 is set to a height such that the surface of the cap 25 having the metal plate 253 can abut the outer surface of the fan cover 203f, in a state in which the pin 27 of the connection terminal 24 is mounted by surface contact normally to the leading end face 28a of the second mounting part 28. With the connection terminal 24, due to being supported by at least two points of the second mounting part 28 and a site other than the second mounting part 28 (abutting site between cap 25 and fan cover 203f in the present embodiment), it is thereby possible to stably mount the connection terminal 24 in a disconnected state to the power unit main body 2, without applying unreasonable load on the connection terminal 24 or second mounting part 28.

Sites other than the second mounting part 28 may not be provided to the cap 25, or may be a part of the connection terminal 24 other than the pin 27. For example, one side face of the connection terminal main body 240 may be configured so as to abut the outer surface of the front motor cover 203a or fan cover 203f. However, by providing a site other than the second mounting part 28 to the cap 25 as in the present embodiment, since it is possible to distance as much as possible the distance between the two points supporting the connection terminal 24, it is possible to further stabilize the mounted state of the connection terminal 24 to the second mounting part 28.

It should be noted that, in the present embodiment, by establishing the projecting height of the second mounting part 28 as the same projecting height as the fan cover 203f as shown in FIG. 25, the leading end face 28a of the second mounting part 28 and the leading end face of the fan cover 203f (abutting site of cap 25) are configured to be arranged on the same plane. This is because the surface of the pin 27 of the connection terminal 24 and the surface of the cap 25 mounted to the connection terminal 24 having the metal plate 263 are arranged on the same plane. By appropriately adjusting the projecting height of the second mounting part 28 (position of leading end face 28a) in this way, it is possible to stably support the connection terminal 24 mounted to the second mounting part 28 at two points.

Second Embodiment

<Configuration of Work Machine>

Figure 26:
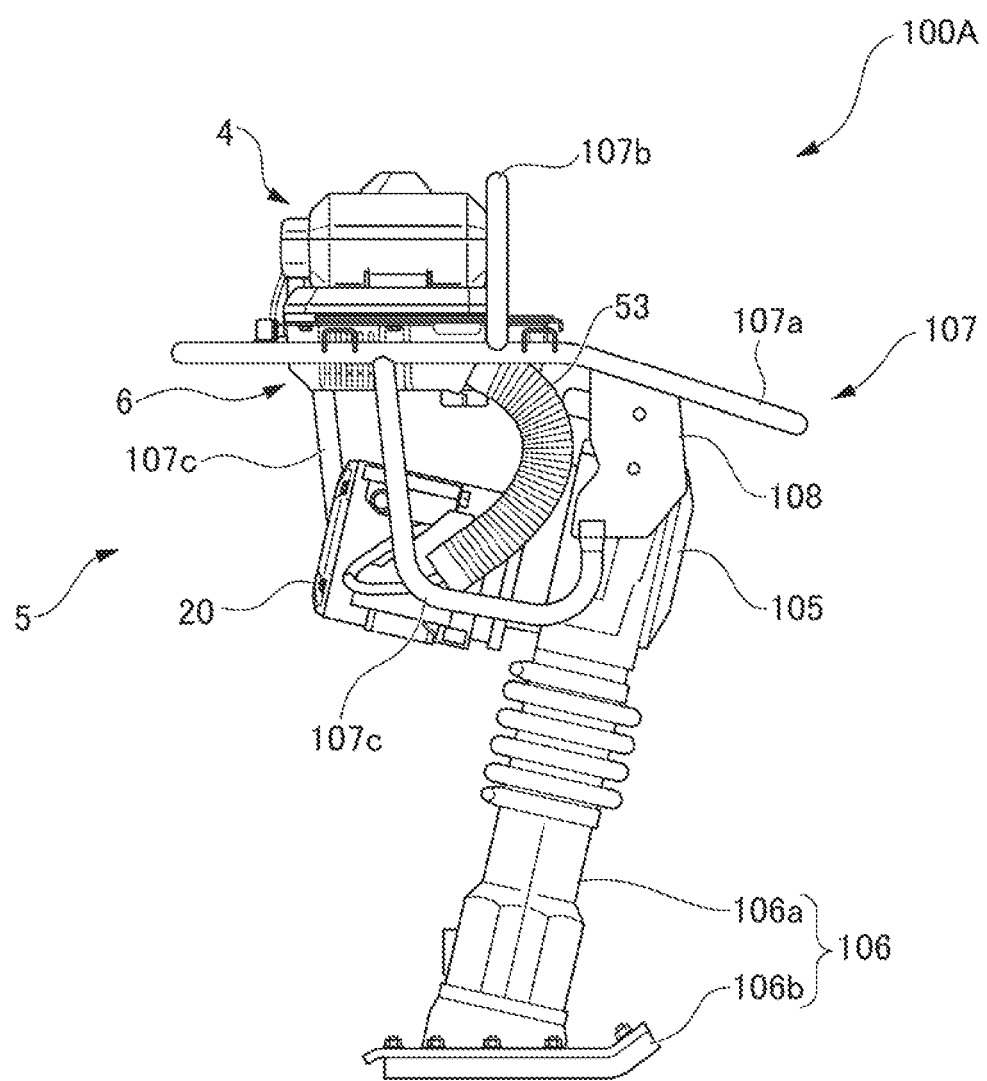
FIG. 26 is a perspective view showing a configuration example of a work machine equipped with an electrical power unit according to a second embodiment.

A second embodiment of an electrical power unit will be explained in detail while referencing the drawings. FIG. 26 is a perspective view showing a configuration example of a work machine equipped with the electrical power unit according to the second embodiment. The present embodiment exemplifies a rammer which is a form of a ground leveling device as the work machine 100A. The work machine 100A is a work machine equipped with the electrical power unit 5 as the power source. In detail, the work machine 100A includes the electrical power unit 5, excitation mechanism unit 105, working mechanism unit 106, and handle 107.

The electrical power unit 5, similarly to the electrical power unit 1 shown in the first embodiment, has a power unit main body 6 having a motor 20, and the battery 4 which is a driving source which drives this power unit main body 6. The configuration of this electrical power unit 5 will be explained in further detail at a later stage.

The excitation mechanism unit 105 has a crank (not illustrated) coupled to be able to transmit power with the motor 20. The excitation mechanism unit 105 converts the rotational power of the motor 20 into vertical motion by the crank, and transmits to the working mechanism unit 106. The working mechanism unit 106 is a part carrying out mainly ground compaction, and is an embodiment of a contact patch member. The working mechanism unit 106 has a leg 106a that can telescope vertically, and a rolling compaction plate 106b which is provided at the lower end of this leg 106a and contacts the ground. The leg 106a moves up and down by the excitation mechanism unit 105, and bounces up the work machine 100A itself by the recoil at this time. The work machine 100A causes compaction force to generate on the ground, by making the impact when dropping to act on the ground by the rolling compaction plate 106b. It should be noted that this power unit main body 6 and excitation mechanism unit 105 are an embodiment of a drive member for driving the contact patch member by electricity.

The handle 107 is configured in a bar shape which is mounted to the excitation mechanism unit 105 and can be gripped by the operator in a standing position. The handle 107 of the present embodiment is configured by a main handle 107a, upper handle 107b, and pair of side handles 107c, 107c. The main handle 107a is mounted to both side faces of the excitation mechanism unit 105 via a vibration suppression member (elastic member) 109 shown in FIGS. 27 and 30 by brackets 108, 108, and is arranged so as to surround the circumference of the power unit main body 6 provided on the top of the work machine 100A in a substantially rectangular shape. The upper handle 107b stands up from parts arranged at the left/right of the power unit main body 6 of the main handle 107a, and extends so as to span left/right to link the main handle 107a. The upper handle 107b is arranged at immediately the back side of the battery 4. The side handles 107c, 107c respectively extend downwards from parts arranged at the left/right of the power unit main body 6 of the main handle 107a, and bend in an L shape at the side of the excitation mechanism unit 105 to be mounted to the excitation mechanism unit 105 by the brackets 108, 108.

<Configuration of Electrical Power Unit>

Figure 27:
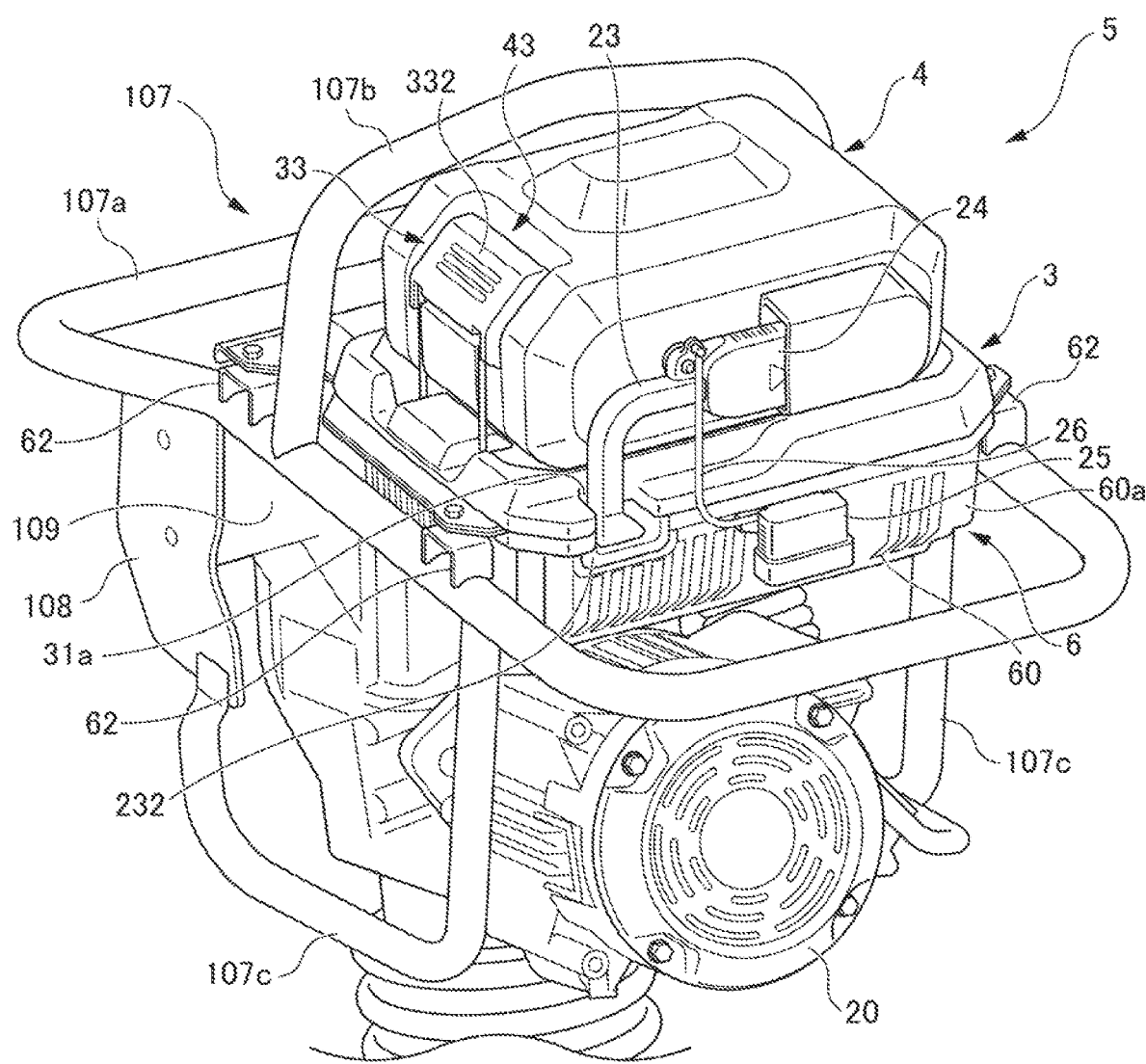
FIG. 27 is a perspective view of the electrical power unit according to the second embodiment showing a state in which the connection terminal is connected to the battery.
Figure 28:
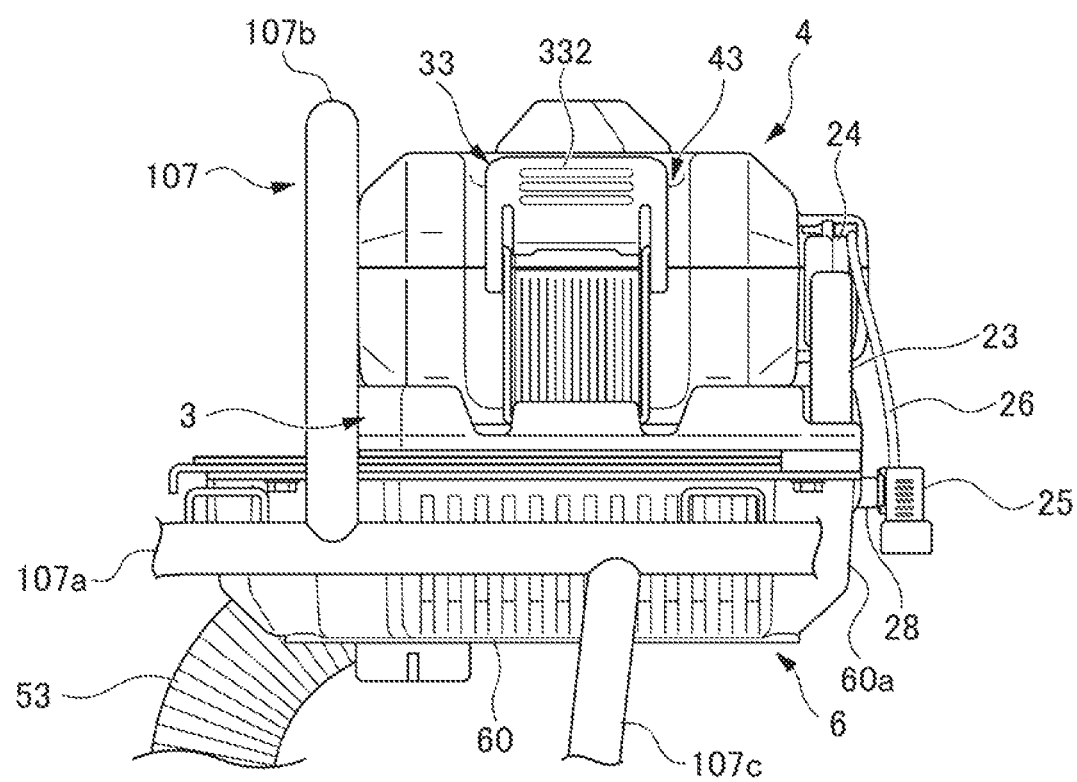
FIG. 28 is a left-side view of the electrical power unit shown in FIG. 27.
Figure 29:
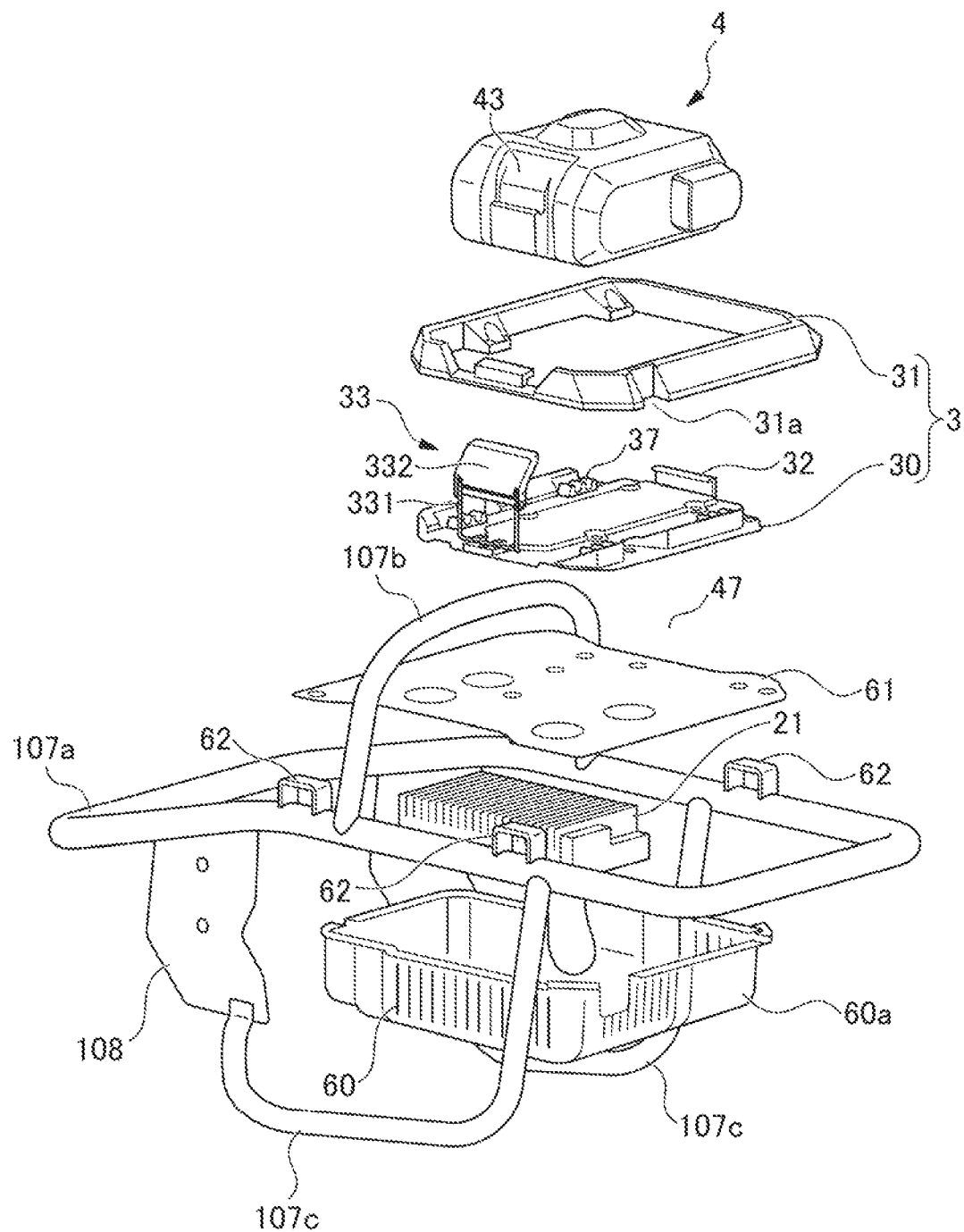
FIG. 29 is an exploded perspective view of main parts of the electrical power unit according to the second embodiment.
Figure 30:
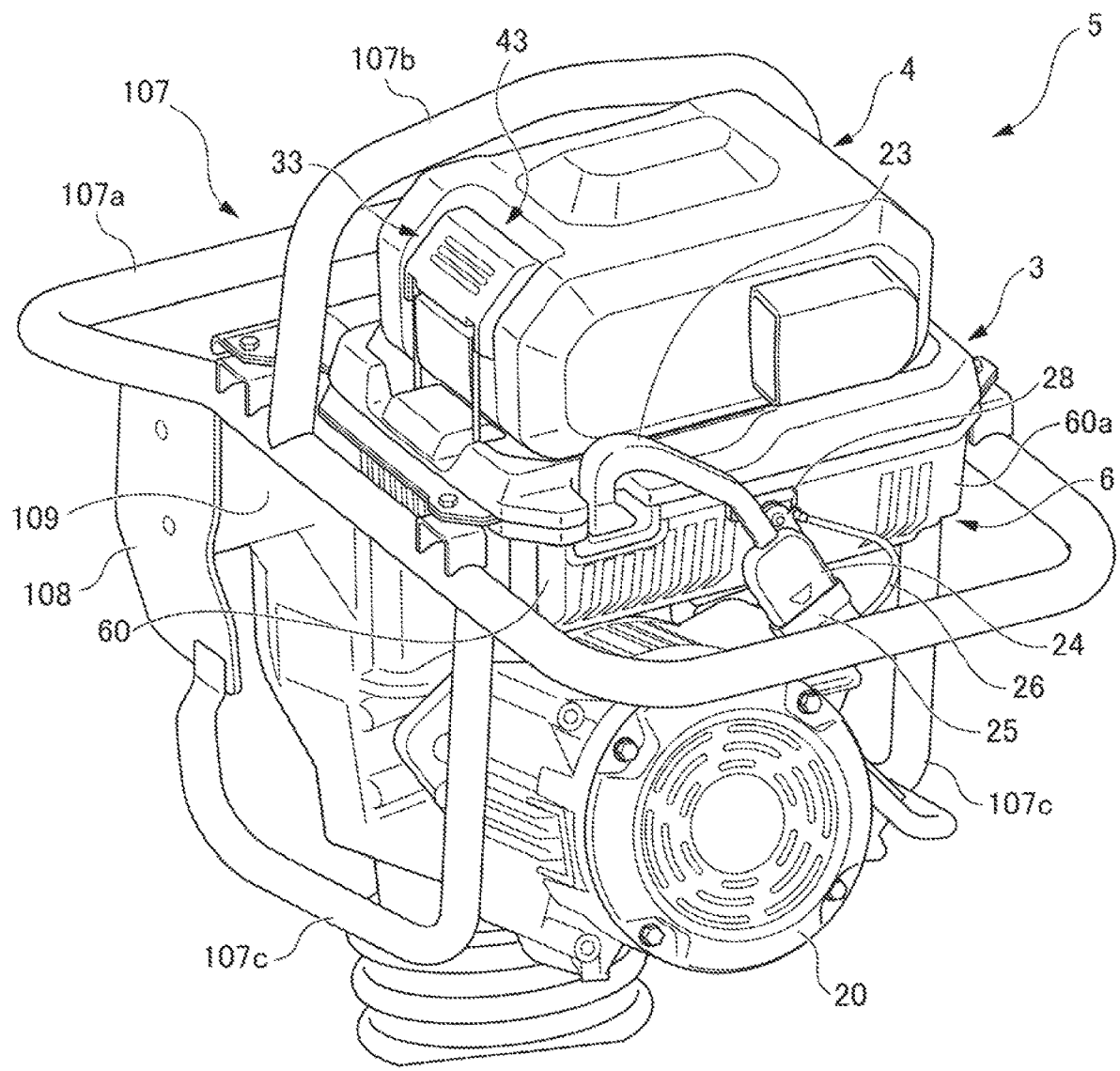
FIG. 30 is a perspective view of the electrical power unit according to the second embodiment showing a state in which the connection terminal was removed from the battery.
Figure 31:
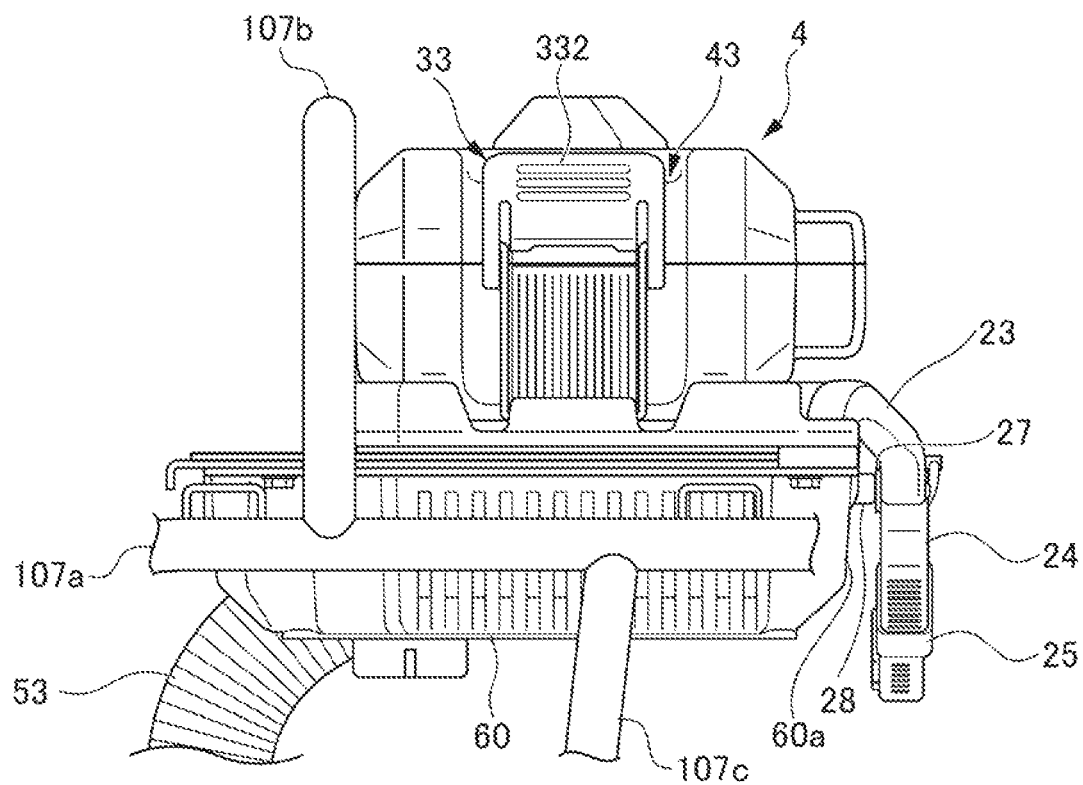
FIG. 31 is a left-side view of the electrical power unit shown in FIG. 30.

Next, the configuration of an electrical power unit 5 according to the second embodiment will be explained. FIG. 27 is a perspective view of the electrical power unit according to the second embodiment showing a state in which the connection terminal is connected to the battery. FIG. 28 is a left-side view of the electrical power unit shown in FIG. 27. FIG. 29 is an exploded perspective view of main parts of the electrical power unit according to the second embodiment. FIG. 30 is a perspective view of the electrical power unit according to the second embodiment showing a state in which the connection terminal is removed from the battery. FIG. 31 is a left-side view of the electrical power unit shown in FIG. 30. It should be noted that, in the electrical power unit 5 according to the second embodiment, due to parts with the same reference symbol as the electrical power unit 1 according to the first embodiment indicating parts of the same configuration, the explanation for the electrical power unit 1 according to the first embodiment is invoked for the detailed explanations of these, and is omitted from the following explanation. In addition, in FIG. 29, fastening members such as screws and bolts for mounting each component are omitted from illustration.

The electrical power unit 5 has a power unit main body 6, battery tray 3, battery 4 and motor 20. The arranged configuration of the motor 20 of the present embodiment, contrary to the arranged configuration of the motor 20 of the electrical power unit 1 of the first embodiment, is arranged to be separated from the power unit main body 6. In other words, the motor 20 of the present embodiment couples the output shaft (rotary shaft) which is not illustrated to the crank (not illustrated) of the excitation mechanism unit 105, and is mounted to the front side of the excitation mechanism unit 105 of the work machine 100A. Furthermore, the power unit main body 6 has the PDU (Power Delivery Unit) 21, and PDU case 60.

The PDU case 60 is formed in a rectangular container shape having a top face opened, and stores the PDU 21 inside. The PDU case 60 storing the PDU 21 is covered by a top plate 61, and is mounted to be hanging inside of the main handle 107a via an appropriate number of support legs 62 mounted on the main handle 107a. The battery tray 3 is placed on the top plate 61.

The PDU 21 is electrically connected with the motor 20 by the main harness 53, as shown in FIG. 26. In addition, as shown in FIG. 27, the harness 23 having the connection terminal 24, which is the connecting part with the battery 4, is electrically connected to the PDU 21 inside the PDU case 60, and is drawn to outside from within the PDU case 60 through the harness drawing part 31a provided in the battery tray 3, and extends to the battery 4.

In the present embodiment, the second mounting part 28 which is detachable with the connection terminal 24 and cap 25 is provided to the front face 60a of the PDU case 60 of the power unit main body 6. As shown in FIG. 27 and FIG. 28, it is thereby possible to mount the cap 25 to the second mounting part 28 on the front face 60a of the PDU case 60, while the connection terminal 24 is connected with the battery 4. On the other hand, as shown in FIG. 30 and FIG. 31, while the connection terminal 24 is removed from the battery 4, it is possible to mount the connection terminal 24 to the second mounting part 28 on the front face 60a of the PDU case 60 in a state mounting the cap 25 to the connection terminal 24. For this reason, according to the electrical power unit 5 of the present embodiment and the work machine 100A equipped with the electrical power unit 5, it is possible to obtain similar effects as the first embodiment.

It should be noted that, although the work machine 100A according to the second embodiment is supporting the connection terminal 24 mounting the cap 25 to the second mounting part 28 at only the one point of the pin 27 of the connection terminal 24 as shown in FIG. 30 and FIG. 31, similarly to the work machine 100 according to the first embodiment, it may be configured so as to provide support-dedicated components for supporting the connection terminal itself of the cap 25 mounted to the connection terminal 24, to the front face 60a or the like of the PDU case 60, so as to make the connection terminal 24 supportable at sites other than the second mounting part 28.

Third Embodiment

Figure 32:
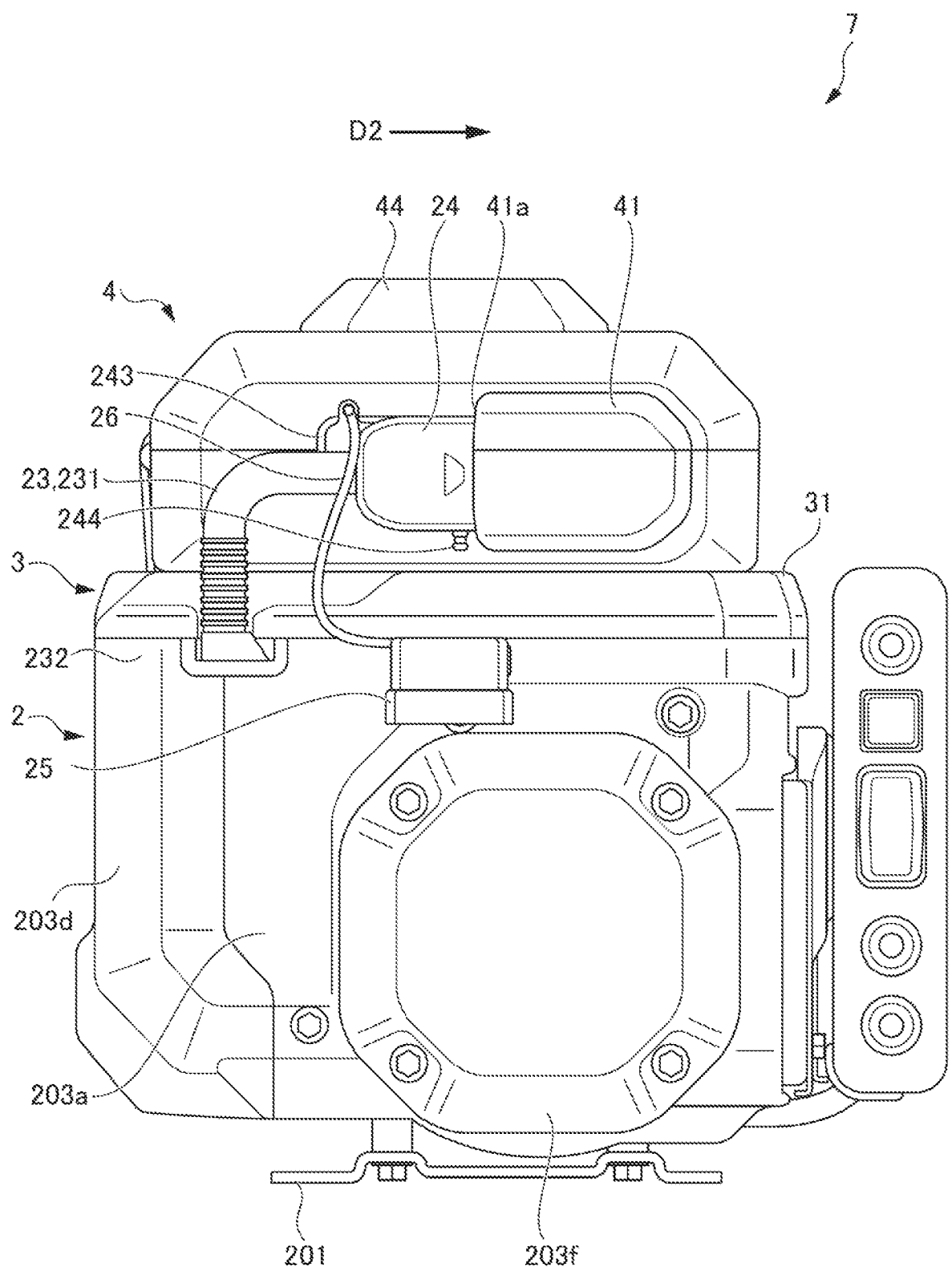
FIG. 32 is a front view of an electrical power unit according to a third embodiment.
Figure 33:
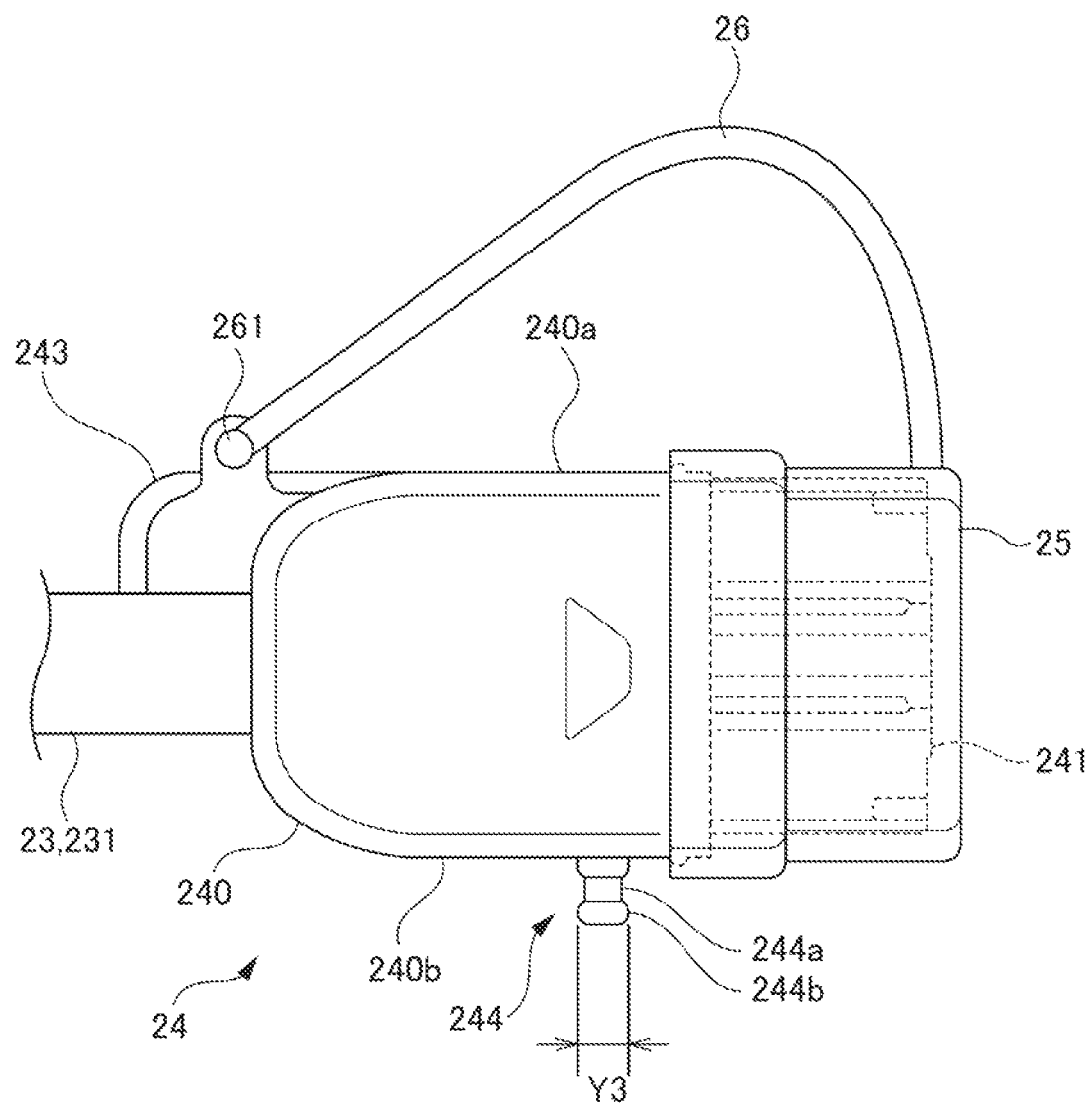
FIG. 33 is a front view of a connection terminal of the electrical power unit according to the third embodiment.

The configuration of the electrical power unit 7 according to a third embodiment will be explained by referencing the drawings. In the electrical power unit 7 according to the third embodiment, due to parts with the same reference symbol as the electrical power unit 1 according to the first embodiment indicating parts of the same configuration, the explanation for the electrical power unit 1 according to the first embodiment is invoked for the detailed explanations of these, and is omitted from the following explanation. FIG. 32 is a front view of an electrical power unit according to the third embodiment showing a state in which the connection terminal is connected to the battery. FIG. 33 is a front view of the connection terminal of the electrical power unit according to the third embodiment.

The electrical power unit 7 according to the third embodiment has a different configuration for detachably mounting the connection terminal 24 removed from the battery 4 to the power unit main body 2, in relation to the electrical power unit. 1 according to the first embodiment. In detail, the connection terminal 24 of the electrical power unit 7 has a protruding part 244, and the electrical power unit 7 has a first mounting part 38 which is a mounting part that engages the detaching part 244 of the connection terminal 24 to detachably mount the connection terminal 24.

The protruding part 244 is one embodiment of the first detaching part which detachably mounts the connection terminal 24 to the first mounting part 38. The protruding part 244 is provided to another side face 240b among the two side faces 240a, 240b arranged contrary in the connection terminal main body 240. When the connection terminal 24 is connected to the connection part 41 through the opening part 41a of the battery 4, as shown in FIG. 32, this side face 240b is a side face arranged in a direction intersecting this connection direction. More specifically, when the connection terminal 24 is connected to the connection part 41 of the battery 4, the side face 240b is a face arranged facing below where the power unit main body 2 is arranged, and is a face arranged opposing the upper face 31b of the battery tray 3 on which the first mounting part 38 described later is provided. As shown in FIG. 32, upon the connection terminal 24 being connected to the connection part 41 of the battery 4, the protruding part 244 is provided to the side face 241b arranged at the outer side of the opening part 41a, and upon the cap 25 being mounted to the connection part 241 of the connection terminal 24 as shown in FIG. 33, is provided to the side face 240b so as to be arranged at a position not interfering with the cap 25.

The protruding part 244 is made of resin, and is projecting from the side face 240b in a substantially cylindrical shape. As shown in FIG. 33, the protruding part 244 has a small-diameter 244a which is partially small diameter, and a large-diameter 244b adjacent to a leading end side of the small-diameter part 244a. The large-diameter 244b configures a swelling part which swells more to the outer side in the radial direction than the small-diameter part 244a, in the protruding part 244. This large-diameter 244b configures a locking part which locks so that the protruding part 244 does not easily slip out from the first mounting part 38, upon the protruding part 244 being mounted to the first mounting part 38 described later.

Figure 34:
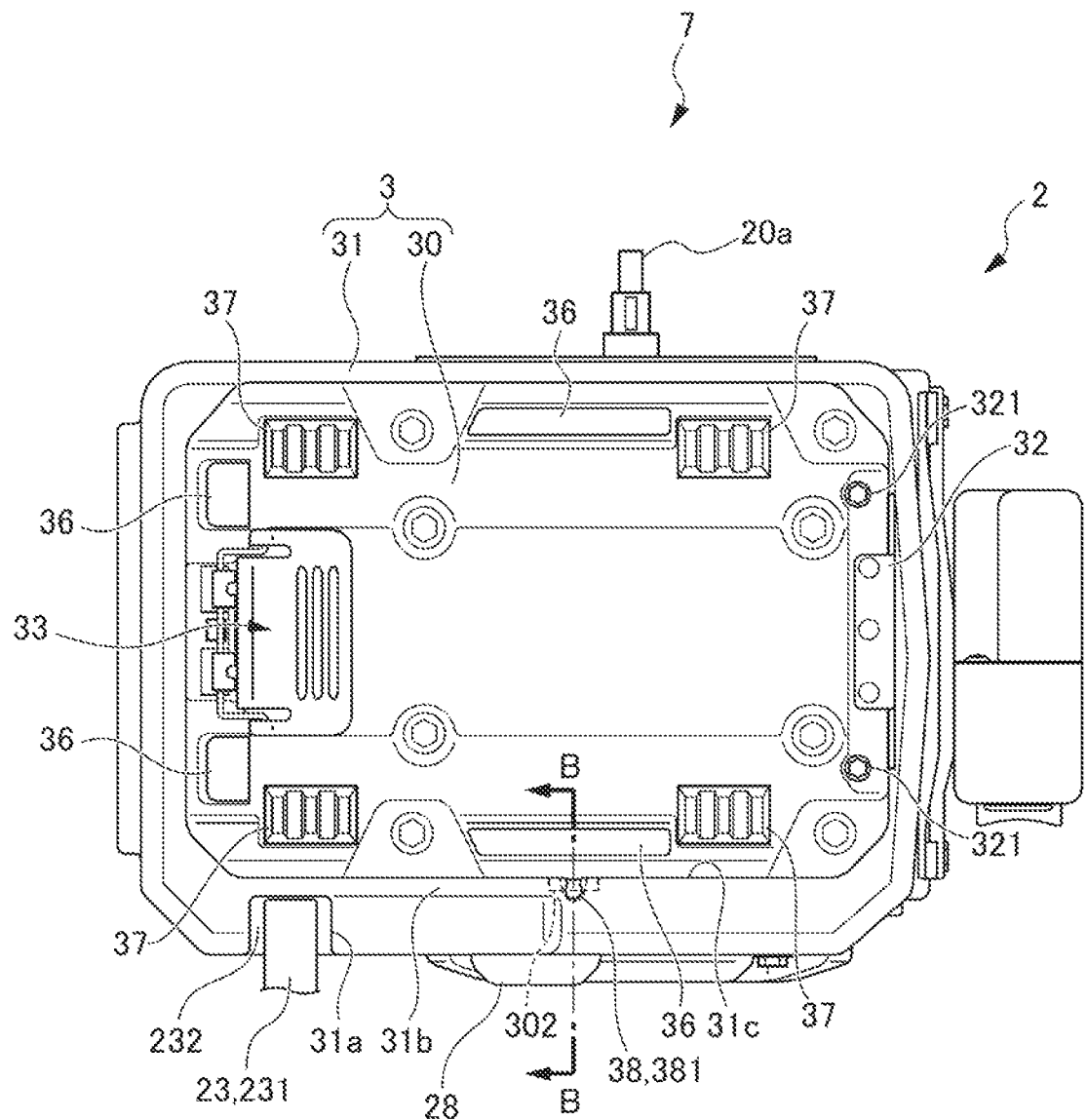
FIG. 34 is a plan view showing a state removing a battery from the electrical power unit according to the third embodiment.
Figure 35:
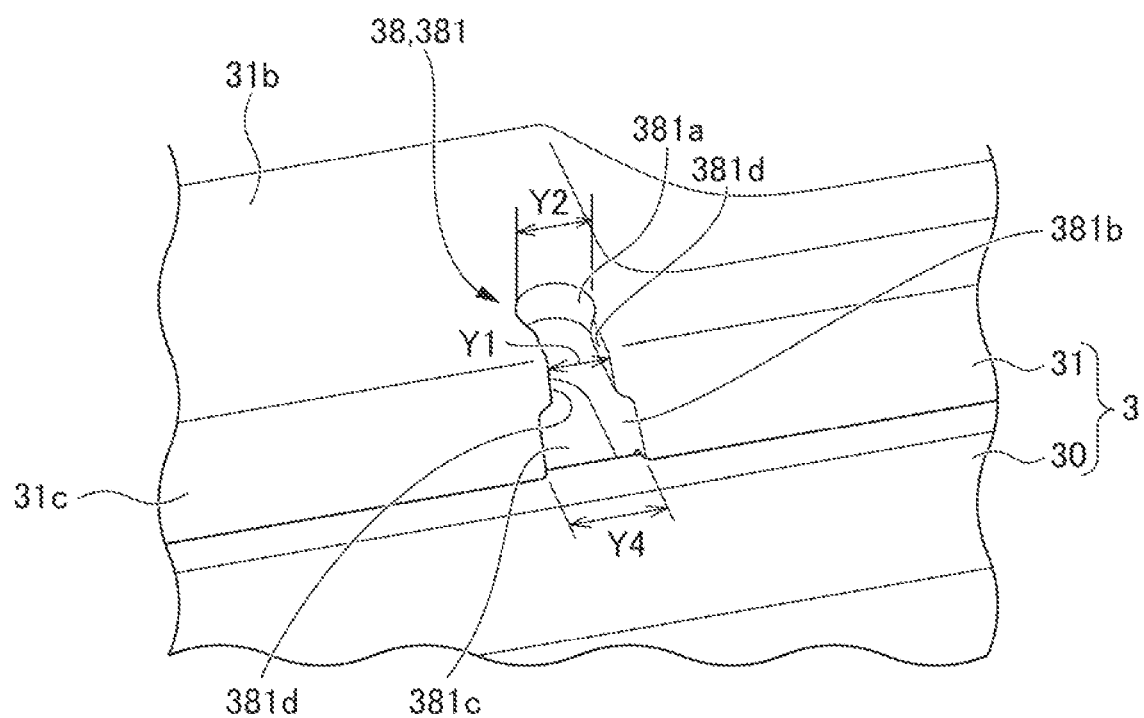
FIG. 35 is an enlarged view showing a connection terminal mounting part in the electrical power unit according to the third embodiment.
Figure 36:
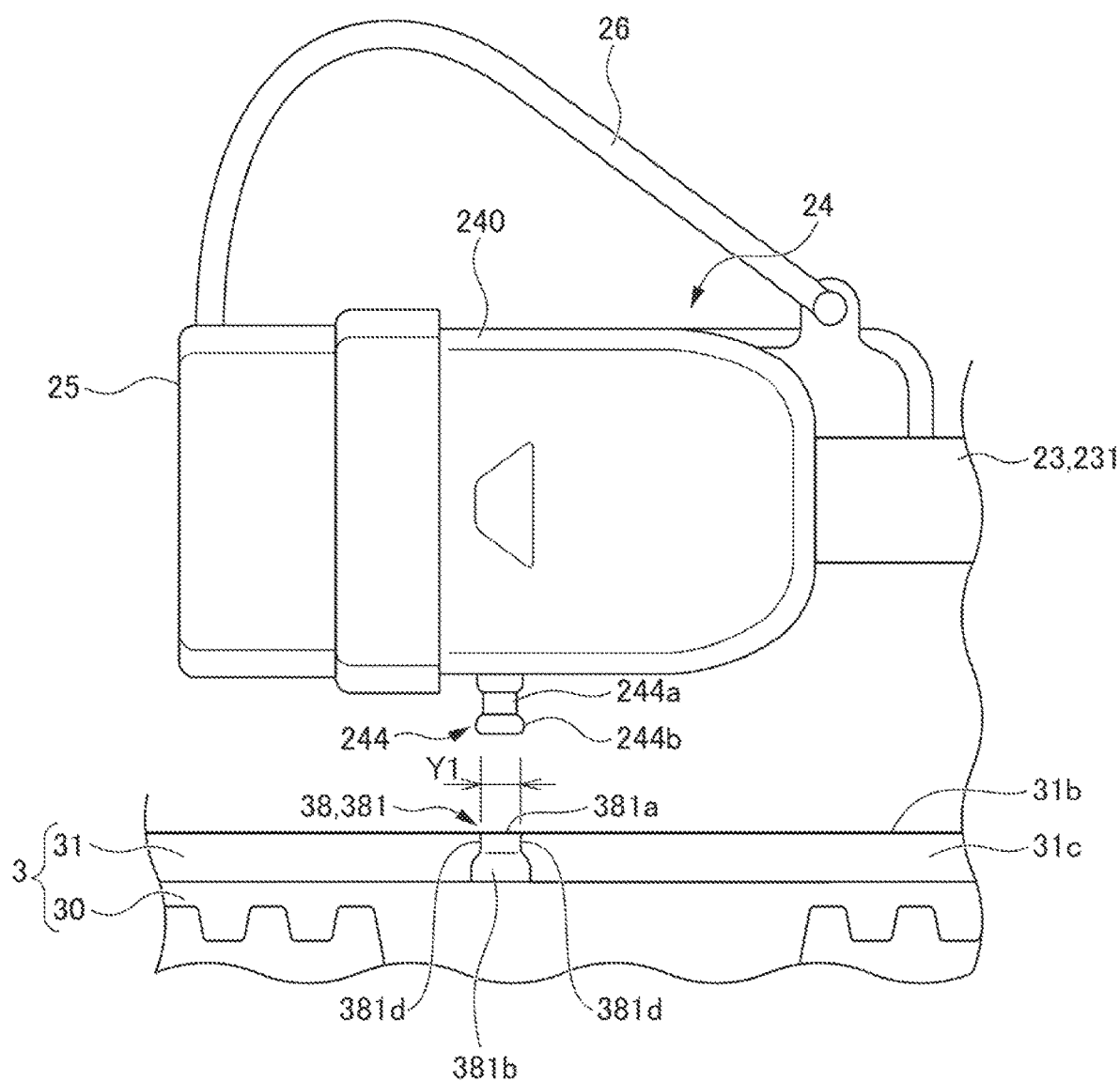
FIG. 36 is an enlarged view showing an aspect of mounting the connection terminal to the connection terminal mounting part of the electrical power unit according to the third embodiment.
Figure 37:
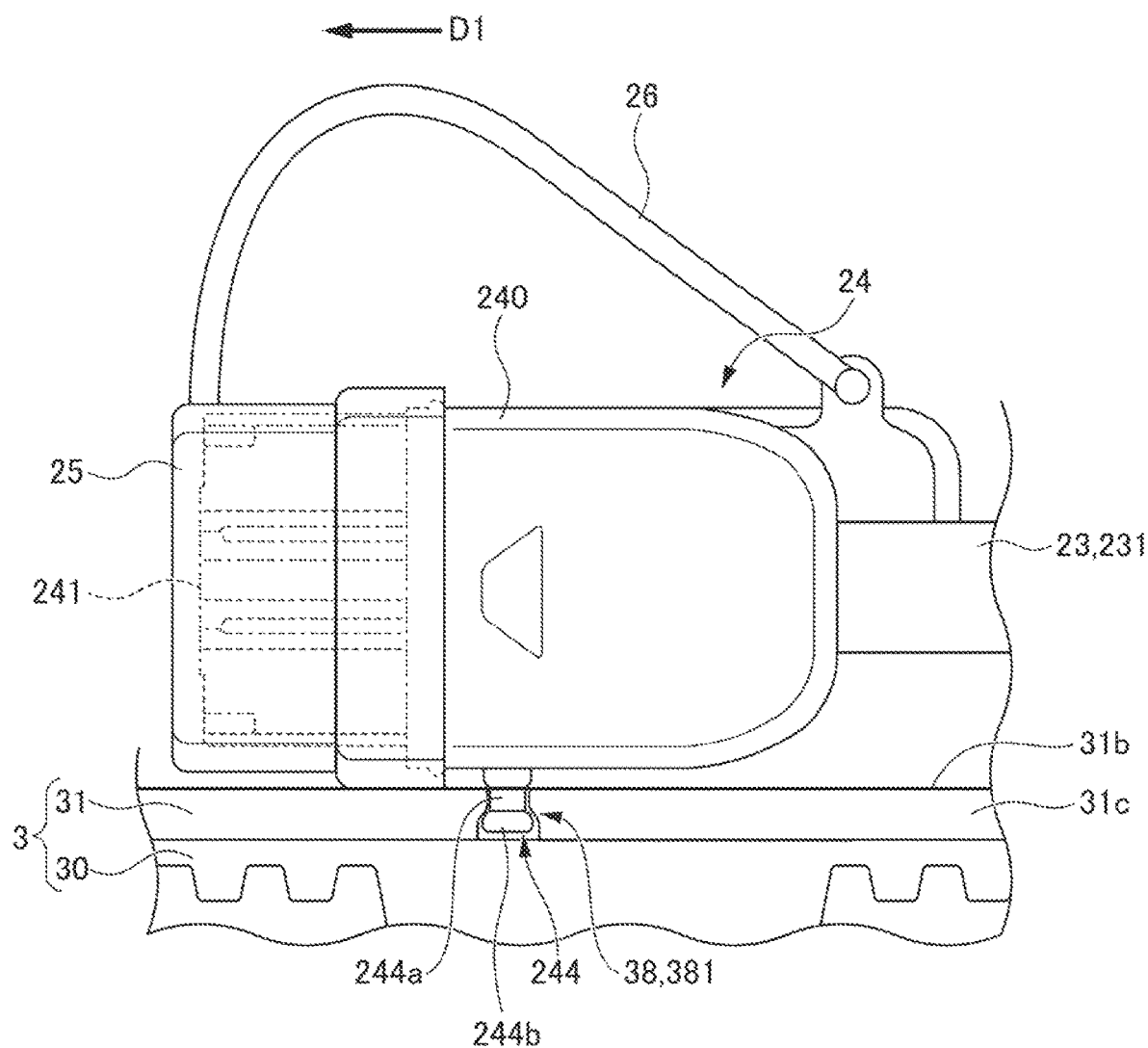
FIG. 37 is an enlarged view showing a state mounting the connection terminal to the connection terminal mounting part of the electrical power unit according to the third embodiment.
Figure 38:
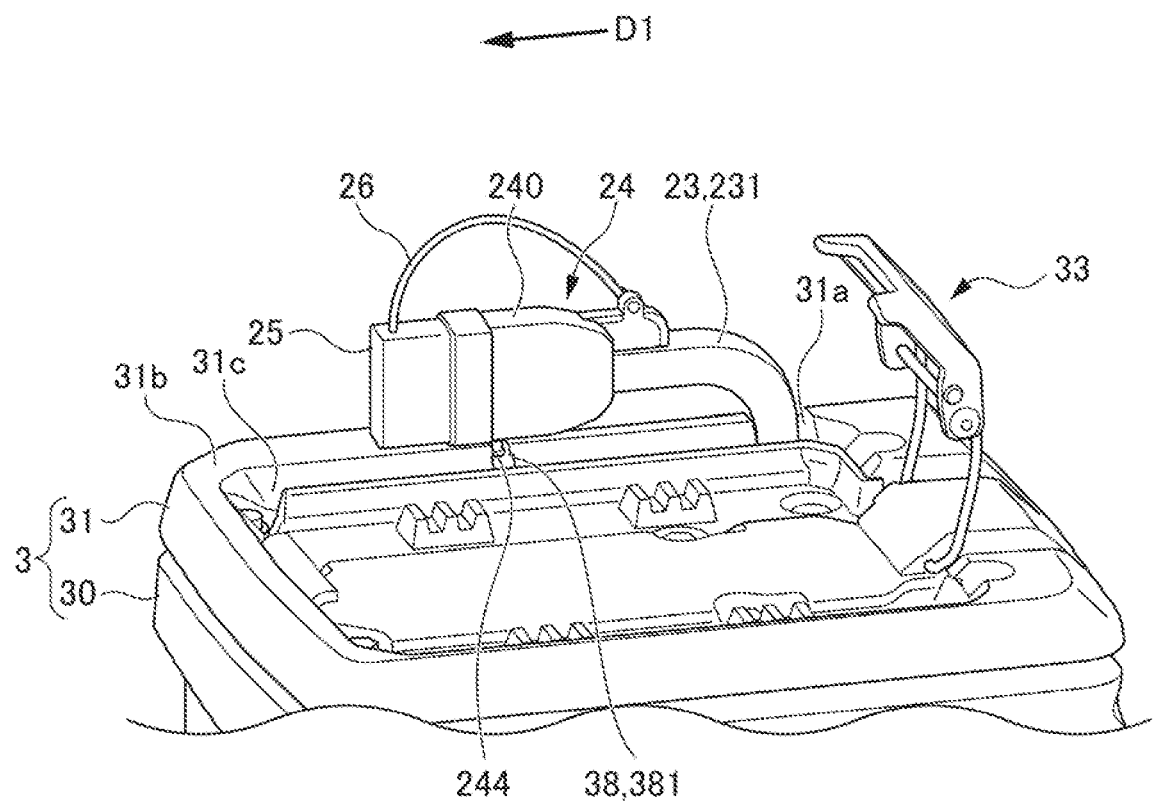
FIG. 38 is a perspective view showing a state mounting the connection terminal to the connection terminal mounting part of the electrical power unit according to the third embodiment.

Next, the first mounting part 38 of the electrical power unit 7 will be explained by referencing FIGS. 34 to 38. FIG. 34 is a plan view showing a state removing the battery 4 from the electrical power unit 7. FIG. 35 is an enlarged view showing a connection terminal mounting part of the electrical power unit 7. FIG. 36 is an enlarged view showing an aspect of mounting the connection terminal 24 to the connection terminal mounting part of the electrical power unit 7. FIG. 37 is an enlarged view showing a state mounting the connection terminal 24 to the connection terminal mounting part of the electrical power unit 7. FIG. 38 is a perspective view showing a state mounting the connection terminal 24 to the connection terminal mounting part of the electrical power unit 7.

The first mounting part 38 detachably mounting the connection terminal 24 is arranged at the decorative cover 31 of the battery tray 3 arranged at the upper face of the power unit main body 2. In detail, the first mounting part 38 is arranged at the upper face 31b of the decorative cover 31 on the front side of the power unit main body 2 which is the same site at which the harness drawing part 31a is arranged. In further detail, the first mounting part 38 is arranged so as to be opposable with the protruding part 244 of the connection terminal 24, upon folding sideways the second portion 231 of the harness 23 of the connection terminal 24 so as to follow the upper face 31b of the decorative cover 31 on the front side of the power unit main body 2, as shown in FIG. 36.

The first mounting part 38 consists of a recess groove 381 having an upward opening part 381a at the upper face 31b consisting of the substantially horizontal plane of the decorative cover 31, as shown in FIG. 35. The recess groove 381 is formed by cutting out part of an inner circumferential face 31c consisting of a substantially vertical face of the decorative cover 31. In the recess groove 381, a side near the inner circumferential face 31c of the decorative cover 31, i.e. side close to the battery 4 placed on the battery tray 3, has a lateral opening part 381b opened towards the placed battery 4. In the recess groove 381, a side far from the placed battery 4 (side face) is closed. The depth of the recess groove 381 from the upward opening part 381a to the bottom 381c is substantially equal to the height by which the protruding part 244 projects from the side face 240b of the connection terminal 24.

The width of the recess groove 381 when viewing the recess groove 381 from the inner side of the decorative cover 31, i.e. width of the lateral opening part 381b, is small at the side of the upward opening part 381a, and large at the side of the bottom 381c. In detail, the recess groove 381 has a pair of projecting parts 381d, 381d projecting to be opposing so as to partially narrow the width of the lateral opening part 381b on the side of the upward opening part 381a, as shown in FIG. 35. The interval Y1 of the pair of projecting parts 381d, 381d is equal or slightly smaller than the outer diameter of the small-diameter part 244a of the protruding part 244 of the connection terminal 24. The inner diameter Y2 of the upward opening part 381a of the recess groove 381 is formed to be smaller than the outer diameter Y3 of the large-diameter part 244b of the protruding part 244, and somewhat larger than the outer diameter of the small-diameter part 244a. In contrast, the width Y4 of the lateral opening part 381b on the side of the bottom 381c is equal or slightly larger than the outer diameter Y3 of the large-diameter part 244b of the protruding part 244 of the connection terminal 24.

In the electrical power unit 7 having this protruding part 244 and first mounting part 38, the connection terminal 24 is mounted to the first mounting part 38 by configuring as follows relative. First, the connection terminal 24 from which connection with the battery 4 was released is folded sideways so as to make the protruding part 244 approach the first mounting part 38 consisting of the recess groove 381 as shown in FIG. 36, i.e. so as to make the second portion 231 of the harness 23 of the connection terminal 24 follow the upper face 31b of the decorative cover 31 on the front side of the power unit main body 2. Subsequently, when the connection terminal 24 is pushed towards the lateral opening part 381b of the recess groove 381 from the inner side of the decorative cover 31, the protruding part 244 is accommodated within the recess groove 381 by elastically engaging with the recess groove 381, as shown in FIG. 37. The connection terminal 24 is thereby mounted to the first mounting part 38, as shown in FIG. 38.

Since the inner diameter Y2 of the upper opening part 381a of the recess groove 381 is smaller than the outer diameter Y3 of the large-diameter part 244b of the protruding part 244, the protruding part 244 accommodated within the recess groove 381 will not slip out upwards, and the interval Y1 of the pair of projecting parts 381d, 381d of the recess groove 381 is equal or slightly smaller than the outer diameter of the small-diameter part 244a of the protruding part 244; therefore, the mounting state of the connection terminal 24 is strongly maintained. The front face (side face far from the placed battery 4) side of the recess groove 381 is blocked; therefore, the first mounting part 38 is hardly visible from outside, both upon the battery 4 being placed on the battery tray 3, and upon being removed from the battery tray 3. For this reason, it is possible to improve the design of the electrical power unit 7.

The first mounting part 38 can retain the connection terminal 24 removed from the battery 4 close to the battery 4, due to being provided to the battery tray 3. It is thereby possible to suppress the length of the harness 23, and possible to configure the electrical power unit 7 compactly. Furthermore, the first mounting part 38 is provided to the upper face 31b of the battery tray 3, and the protruding part 244 of the connection terminal 24 is provided to the side face 240b of the connection terminal 24; therefore, it is possible to laterally mount the connection terminal 24 to the first mounting part 38. For this reason, even if forgetting to mount the cap 25 to the terminal part 241 of the connection terminal 24, the terminal part 241 is arranged sideways, and can suppress the infiltration of rain water, etc. into the connection terminal 24. Furthermore, since the upper face 31b of the battery tray 3 is a substantially horizontal plane, it is possible to even further suppress infiltration of rain water, etc. into the connection terminal 24.

The first mounting part 38 is provided to the decorative cover 31 arranged so as to project upwards from the circumference of the battery 4 in the battery tray 3; therefore, it is possible to bring together the mounting position of the connection terminal 24 to the first mounting part 38, and the connection position of the connection terminal 24 to the battery 4. It is thereby possible to make the length of the harness 23 the minimum requirement, and thus possible to configure the electrical power unit 7 even more compactly.

As shown in FIGS. 37 and 38, the direction D1 in which the connection terminal 24 is oriented upon the connection terminal 24 being mounted to the first mounting part 38 is the same direction as the direction D2 in which the connection terminal 24 is oriented upon the connection terminal 24 being connected to the battery 4, as shown in FIG. 32. The direction D1 in which the connection terminal 24 is oriented is the direction in which the terminal part 241 projects to the connection terminal main body 240. In the present embodiment, this direction D1 is a direction substantially parallel to the direction D2, and is a direction substantially parallel also to the upper face of the battery tray 3, which is the placement surface of the battery 4. It is thereby possible to mount the connection terminal 24 removed from the battery 4 to the first mounting part 38, without requiring to greatly change the attitude. For this reason, it is possible to further shorten the length of the harness 23. Since the movement distance upon mounting the connection terminal 24 removed from the battery 4 to the first mounting part 38 completes the minimal movement distance, the work hours upon mounting the connection terminal 24 to the first mounting part 38 is also shortened.

Figure 39:
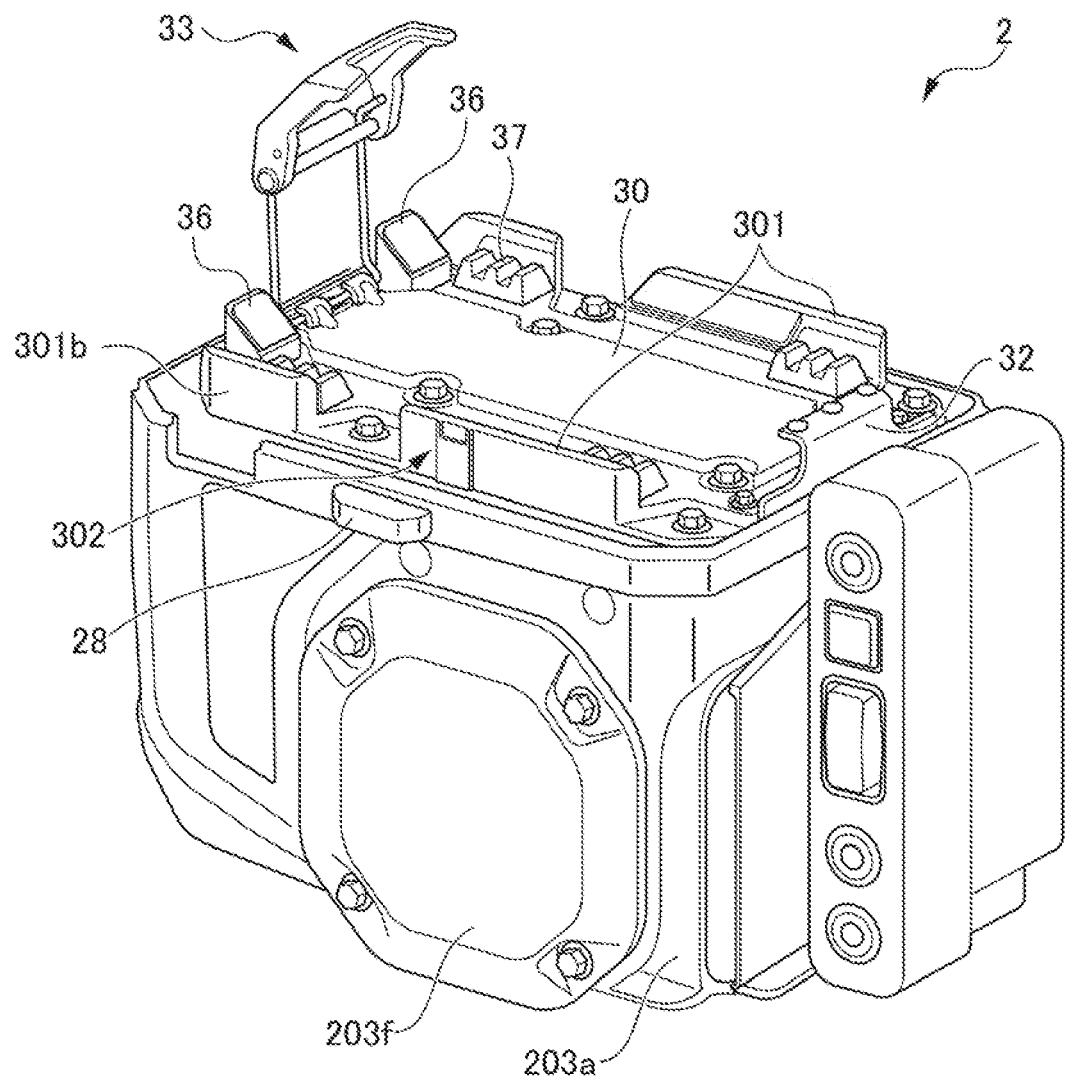
FIG. 39 is a perspective view showing a state removing a decorative cover from a battery tray of the electrical power unit according to the third embodiment.
Figure 40:
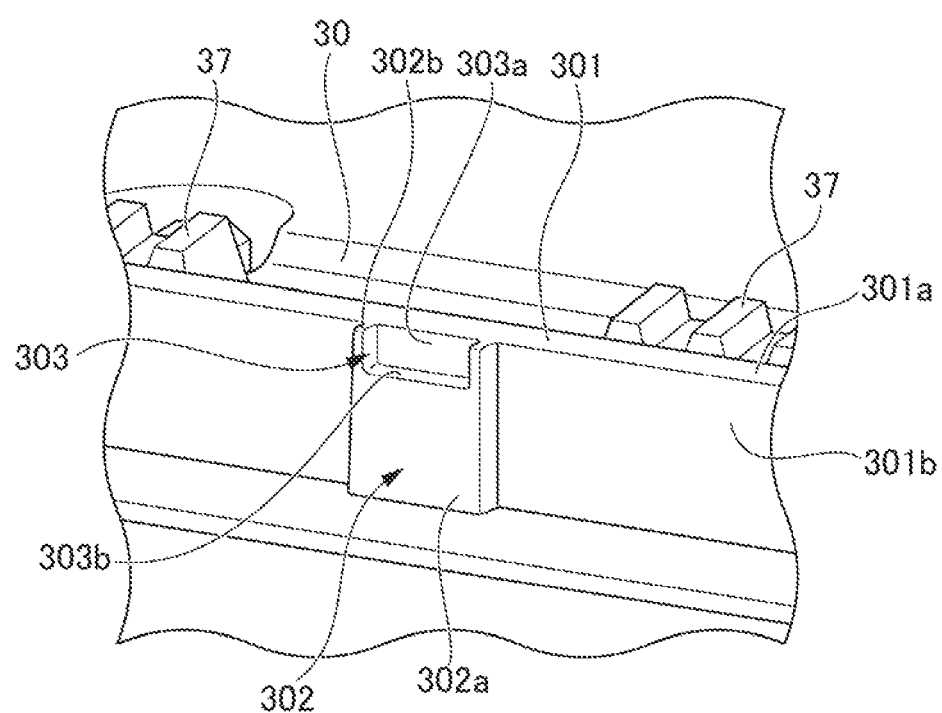
FIG. 40 is an enlarged view showing a projecting part of the tray main body of the electrical power unit according to the third embodiment.
Figure 41:
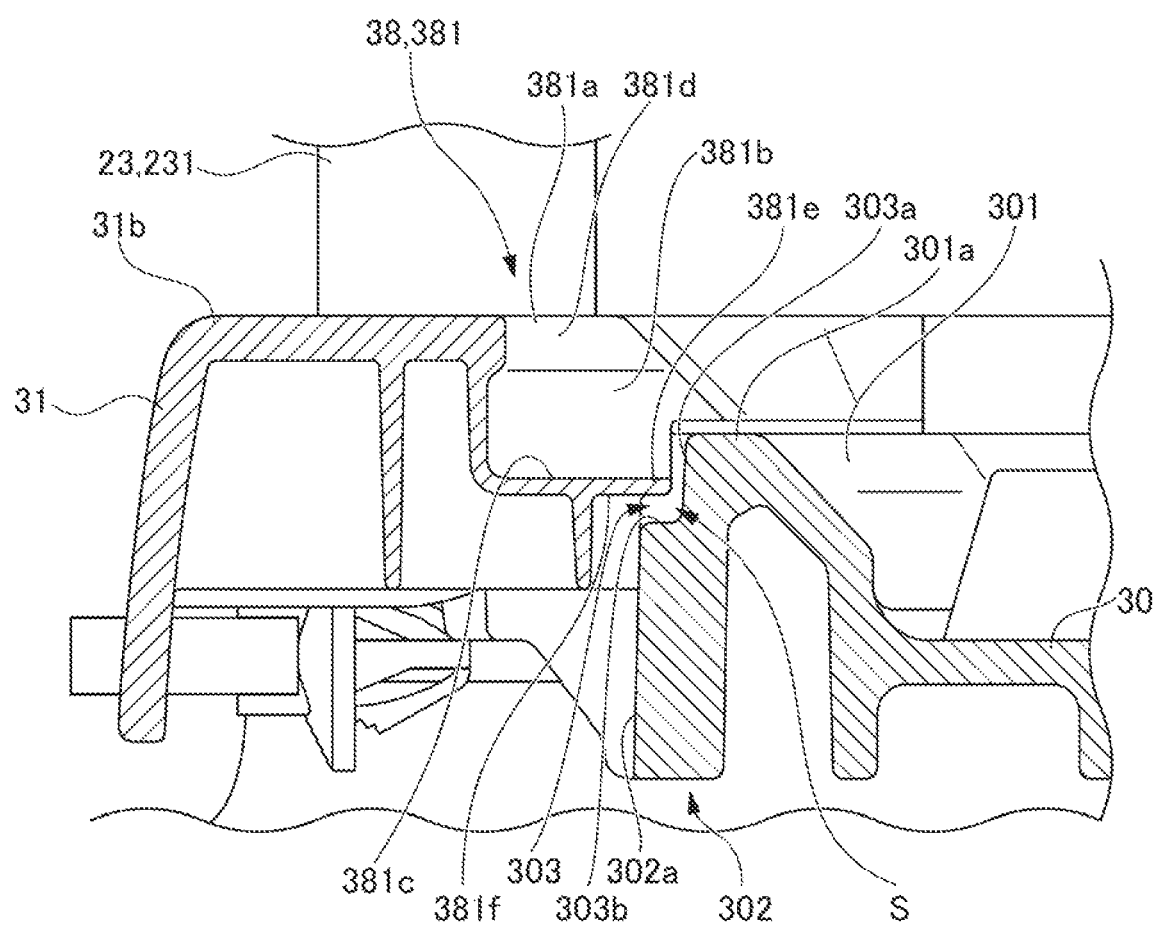
FIG. 41 is a cross-sectional view along the line B-B in FIG. 34.

FIG. 39 is a perspective view showing a state removing the decorative cover 31 from the battery tray 3 of the electrical power unit 7. FIG. 40 is an enlarged view showing a projecting part of the tray main body 30 of the electrical power unit 7. FIG. 41 is a cross-sectional view along the line B-B in FIG. 34. In FIG. 39, the battery 4 is removed. Illustration of the connection terminal 24 and harness 23 is omitted.

As shown in FIG. 39, the tray main body 30 of the battery tray 3 has a projecting wall part 301 which projects from the outer circumferential edge upwards. The projecting wall part 301 is a site covered by the decorative cover 31 and arranged to abut the inner circumferential edge of the decorative cover 31, and vertically arranged so as to respectively follow lower parts on the front side (side on which the harness drawing part 31a is arranged) and rear side of the battery 4.

The projecting part 302 is provided to the front face 301b of the projecting wall part 301. The projecting part 302 is formed in a rectangular shape in a front view, and slightly projects forwards from the front face 301b of the projecting wall part 301. The site of the front face 301b at which the projecting part 302 is provided corresponds to the position of the first mounting part 38 provided to the decorative cover 31, as shown in FIG. 34.

The projecting part 302 has a projecting face 302a which projects in a rectangular shape forwards from the front face 301b of the projecting wall part 301, as shown in FIG. 40. The projecting face 302a is provided over substantially the entire height of the front face 301b of the projecting wall part 301. Therefore, the upper face 302b of the projecting part 302 and the upper face 301a of the projecting wall part 301 are coplanar. The projecting face 302a is arranged slightly more to the front side (left side in FIG. 41) than the position of an inner end part 381e of the bottom 381c of the recessed groove 381 provided to the decorative cover 31, as shown in FIG. 41.

The recessed part 303 provided so as to indent from the front and above relative to the projecting face 302a is provided at the upper part of the projecting part 302. The recessed part 303 has a first side face 303a arranged parallel so as to be coplanar with the front face 301b of the projecting wall part 301, and a second side face 303b arranged parallel to the upper face 301a of the projecting wall part 301, as shown in FIGS. 40 and 41. The upper end of the first side face 303a is connected to the upper face 301a of the projecting wall part 301. The second side face 303b is substantially orthogonal to the first side face 303a, and is provided to span the lower end of the first side face 303a and upper end of the projecting face 302a. The projecting wall part 301 to which the projecting part 302 is arranged thereby is formed step-wise by the first side face 303a, second side face 303b and projecting face 302a of the recessed part 303.

As shown in FIG. 41, the bottom 381c of the recess groove 381 provided to the decorative cover 31 is arranged slightly above the second side face 303b of the recessed part 303, and penetrates more into the recessed part 303 than the projecting face 302a of the projecting part 302 to approach the first side face 303a. The first side face 303a of the recessed part 303 projects slightly more upwards than the bottom 381c of the recess groove 381, and covers the lower part of the lateral opening part 381b of the recess groove 381 from the inner side. Therefore, the projecting part 302 is arranged below the bottom 381c of the recess groove 381, and slightly more forwards than the inner end part 381e of the bottom 381c. For this reason, when viewing the recess groove 381 in a plan view, the projecting part 302 (in more detail, second side face 303b) is arranged so as to overlap the bottom 381c of the recess groove 381.

A small step-shaped gap S is thereby formed as shown in FIG. 41, between the first mounting part 38 in the decorative cover 31 and the projecting wall part 301 of the tray main body 30. In detail, the gap S is formed between the lateral opening part 381b of the recess groove 381 and the first side face 303a of the recessed part 303, between the inner end part 381e of the bottom 381c of the recess groove 381 and the first side face 303a of the recessed part 303, and between the bottom back face 381f of the recess groove 381 and the second side face 303b of the recessed part 303. By this gap S, a so-called labyrinth structure is formed between the first mounting part 38 and projecting wall part 301 of the tray main body 30. Even if the first mounting part 38 is formed by the recess groove 381, upon water splashing on the recess groove 381, it is thereby possible to prevent water from infiltrating from inside the recess groove 381 into the power unit main body 2, or weaken the momentum of infiltrating water. For this reason, it is possible to mitigate the water damage effects on the power unit main body 2.

Fourth Embodiment

Figure 42:
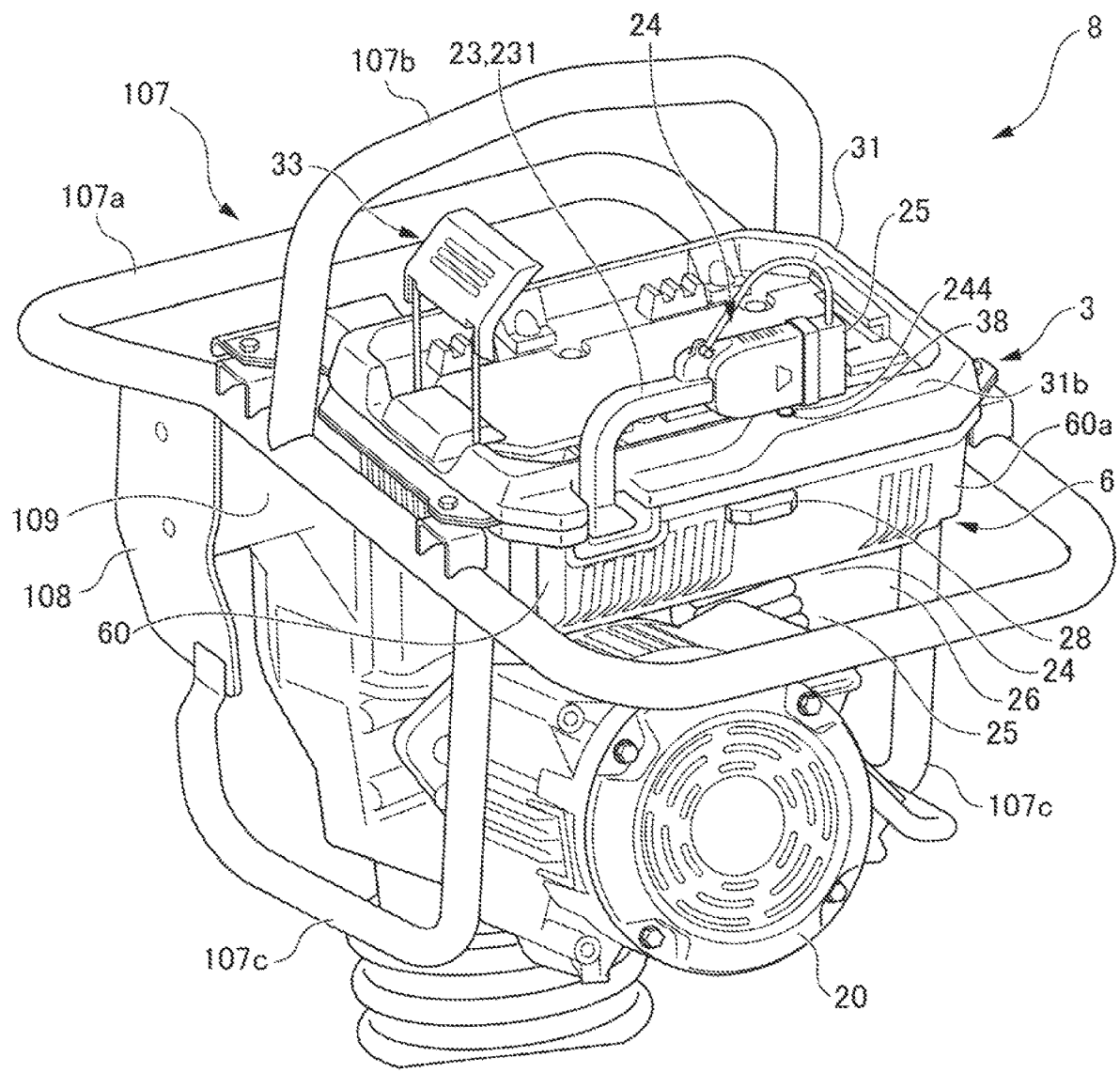
FIG. 42 is a perspective view showing main parts of a work machine equipped with an electrical power unit according to a fourth embodiment.

FIG. 42 is a perspective view showing main parts of a work machine equipped with the electrical power unit 8 according to a fourth embodiment. Due to parts with the same reference symbol as the electrical power unit 5 according to the second embodiment shown in FIG. 27 indicating parts of the same configuration, the explanation for the electrical power unit 5 according to the second embodiment is invoked for the detailed explanations of these, and is omitted from the following explanation.

The electrical power unit 8 shown in FIG. 42 is provided to an upper part of a rammer which is a work machine, similarly to the electrical power unit 5 shown in FIG. 27. For the electrical power unit 8, similarly to the electrical power unit 7 according to the third embodiment, the connection terminal 24 has a protruding part 244, and the first mounting part 38 consisting of the recess groove 381 is provided to the decorative cover 31 of the battery tray 3 provided to an upper part of the power unit main body 6. Therefore, in the electrical power unit 8 of this work machine, it is possible obtain the same effects as the electrical power unit 7 according to the third embodiment.

Other Embodiment

In each of the embodiments explained above, although it is configured so as to provide the second mounting part 28 having the magnet 281 to the power unit main body 2, 6 side, and provide the pin 27 attracting the magnet 281, and the metal plate 253 to the side of the connection terminal 24 and cap 25, it is not limited thereto. It may be configured so as to provide a magnet to the side of the cap 25 and connection terminal 24, and provide a metal component attracting this magnet to a side of the power unit main body 2, 6.

In addition, the configuration for detachably providing the connection terminal 24 and cap 25 to the mounting part is not limited to a configuration by the magnetic attraction between the magnet and metal component. For example, it may be a groove-protrusion engagement, locking using a hook, or the like. However, as explained above, by detachably configuring the connection terminal 24 and cap 25 by magnetic attraction using the magnet 281, since it is possible to perform a detaching operation easily from any direction relative to the mounting part, the workability also improves.

In the third embodiment and fourth embodiment, the connection terminal 24 is mounted to the first mounting part 38 of the battery tray 3, and is not mounted to the second mounting part 28 having the magnet 281. For this reason, the pin 27 attracting the magnet 281 of the second mounting part 28 is not provided to the connection terminal 24. However, the connection terminal 24 may be configured to be mountable to the second mounting part 28 as necessary, by having the pin 27.

Furthermore, the work machine is not limited to the ground leveling device explained above. However, as shown in each of the above embodiments, in the case of the work machine 100, 100A being a ground leveling device, it has a particularly remarkable effect. In other words, while removing the connection terminal 24 from the battery 4 which is an electrical component, it is possible to protect the connection terminal 24 from dust, dirt, pebbles, etc. caught up by other ground leveling work by the cap 25, which is a protective member, and while connecting the connection terminal 24 to the battery 4, by mounting the cap 25 to the second mounting part 28 of the power unit main body 2, 6, it is possible to prevent the cap 25 from shaking due to vibration, etc. of the ground leveling device and becoming a hindrance to the operator.

It should be noted that the work machine is not limited to one configured by equipping only the electrical power unit 1, 5, 7, 8 shown in the present embodiment, and although not illustrated, may be a hybrid-type work machine jointly using the electrical power unit 1, 5, 7, 8 and a general purpose engine.

EXPLANATION OF REFERENCE NUMERALS

1, 5, 7, 8 electrical power unit
2, 6 power unit main body (drive member)
203f fan cover
23 harness (conductive path member)
24 connection terminal
240a side face (of connection terminal)
240b side face (of connection terminal)
241 terminal part
243 coupling base (coupling part, second detaching part)
244 protruding part (first detaching part)
244b large-diameter (locking part)
25 cap (protective member)
251 insertion opening
253 metal plate
26 cable (coupling member)
28 mounting part (second mounting part, protective member mounting part, common mounting part)
281 magnet
3 battery tray (placement member)
30 tray main body (placement member main body)
302 projecting part
31 decorative cover (covering part)
31a upper face (of decorative cover)
38 first mounting part
381 recess groove
381a upper face opening part
381b lateral opening part
381c bottom
4 battery (electrical component)
100, 100A work machine
101, 106 working mechanical section (contact patch member)
102 power transmission mechanism section (drive member)
103, 105 excitation mechanism section (drive member)

The invention claimed is:

1. An electrical power unit comprising:
a power unit main body;
an electrical component which drives the power unit main body; and
a connection terminal which is provided to a leading end of a conductive path member extending from the power unit main body and capable of connecting to the electrical component,
wherein the connection terminal has a detaching part which is capable of attaching and detaching to a mounting part of the power unit main body,
the electrical power unit further comprises a placement member to which the electrical component is detachably provided,
the placement member has a covering part which is disposed so as to project upwards from a circumference of the electrical component,
the mounting part is a recess groove provided at a side of the covering part close to the electrical component, and
the detaching part is formed in a protruding shape having a locking part to the recess groove.

2. The electrical power unit according to claim 1, wherein a direction in which the connection terminal is oriented upon the connection terminal being connected to the electrical component, and a direction in which the connection terminal is oriented upon the connection terminal being mounted to the mounting part are identical directions.

3. A work machine comprising an electrical power unit according to claim 1.

4. The electrical power unit according to claim 1, wherein the detaching part is provided to a side face of the connection terminal disposed in a direction intersecting a projecting direction of a terminal part of the connection terminal upon the connection terminal being connected to the electrical component, or upon the connection terminal being mounted to the mounting part.

5. The electrical power unit according to claim 4, wherein the upper face of the placement member is a substantially horizontal surface.

6. The electrical power unit according to claim 1, wherein a side farther from the electrical component of the recess groove is blocked.

7. The electrical power unit according to claim 6, wherein the placement member has a placement member main body to which the covering part is mounted at an upper face,
wherein the recess groove has a lateral opening part opened at a side close to the electrical component, and
wherein the placement member main body has a projecting part which is arranged below a bottom of the recess groove and overlaps the lateral opening part in a plan view, and forms a labyrinth structure by the bottom of the recess groove and the projecting part.

8. The electrical power unit according to claim 1, wherein the connection terminal has a detaching part which is capable of attaching and detaching to the mounting part, and
wherein the detaching part is provided to span between the connection terminal and the conductive path member.

9. The electrical power unit according to claim 8, wherein the detaching part is provided continuously to a side face of the connection terminal.

10. The electrical power unit according to claim 8, wherein the connection terminal is provided to be capable of attaching and detaching to the mounting part by a magnet.

11. The electrical power unit according to claim 8, further comprising a protective member capable of protecting the connection terminal separated from the electrical component.

12. The electrical power unit according to claim 11, wherein a part of the connection terminal or a part of the protective member other than a site mounted to the mounting part abuts an outer face of the power unit main body, in a state in which the connection terminal protected by the protective member is mounted to the mounting part.

13. The electrical power unit according to claim 1, further comprising a protective member capable of protecting the connection terminal separated from the electrical component.

14. The electrical power unit according to claim 13,
wherein the protective member is provided to be capable of attaching and detaching to a protective member mounting part of the power unit main body.

15. The electrical power unit according to claim 14, wherein the protective member has an insertion opening into which the connection terminal is inserted, and is configured to be mountable to the protective member mounting part so that the insertion opening is directed downwards in the direction of gravity.

16. The electrical power unit according to claim 14, wherein the protective member is provided to be capable of attaching and detaching to the protective member mounting part by a magnet.

17. The electrical power unit according to claim 14, wherein the protective member has a coupling member which is coupled with the connection terminal.

18. The electrical power unit according to claim 17, wherein a coupling part of the connection terminal coupled with the coupling member is provided to span between the connection terminal and the conductive path member.

19. The electrical power unit according to claim 18, wherein the coupling part is provided continuously to a side face of the connection terminal.

20. The electrical power unit according to claim 13,
wherein the power unit main body has a common mounting part capable of attaching and detaching the protective member and the connection terminal.

21. The electrical power unit according to claim 20, wherein the common mounting part is capable of mounting the protective member when the connection terminal is connecting to the electrical component, and is provided to be capable of mounting the connection terminal when the connection terminal is removed from the electrical component.

* * * * *